(12) United States Patent
Eddington et al.

(10) Patent No.: US 12,449,715 B2
(45) Date of Patent: Oct. 21, 2025

(54) SHAPE MEMORY ALLOY ACTUATOR

(71) Applicant: CAMBRIDGE MECHATRONICS LIMITED, Cambridge (GB)

(72) Inventors: Robin Eddington, Cambridge (GB); James Howarth, Cambridge (GB); Konstantinos Pantelidis, Cambridge (GB); Stephen Matthew Bunting, Cambridge (GB); Daniel John Burbridge, Cambridge (GB); Oliver Hart, Cambridge (GB); Joshua Carr, Cambridge (GB); Peter Van Wyk, Cambridge (GB); Stephen Kindness, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 377 days.

(21) Appl. No.: 17/912,654

(22) PCT Filed: Mar. 26, 2021

(86) PCT No.: PCT/GB2021/050741
§ 371 (c)(1),
(2) Date: Sep. 19, 2022

(87) PCT Pub. No.: WO2021/191626
PCT Pub. Date: Sep. 30, 2021

(65) Prior Publication Data
US 2023/0213836 A1    Jul. 6, 2023

(30) Foreign Application Priority Data

Mar. 26, 2020  (GB) ..................... 2004435

(51) Int. Cl.
*G03B 5/00*    (2021.01)
*H04N 23/55*   (2023.01)
*H04N 23/68*   (2023.01)

(52) U.S. Cl.
CPC ............... *G03B 5/00* (2013.01); *H04N 23/55* (2023.01); *H04N 23/685* (2023.01); *G03B 2205/0007* (2013.01); *G03B 2205/0076* (2013.01)

(58) Field of Classification Search
CPC .............. G03B 5/00; G03B 2205/0007; G03B 2205/0076; H04N 23/685
See application file for complete search history.

(56) References Cited

U.S. PATENT DOCUMENTS

| 2007/0280668 A1 | 12/2007 | Kubo et al. |
| 2009/0295986 A1 | 12/2009 | Topliss et al. |
| 2020/0310081 A1* | 10/2020 | Chen ..................... G02B 7/023 |

FOREIGN PATENT DOCUMENTS

| GB | 2569036 | 6/2019 |
| JP | S6017577 | 1/1985 |

OTHER PUBLICATIONS

GB Search Report and Examination Report of GB Application 2004435.0 dated Sep. 23, 2020.
(Continued)

*Primary Examiner* — Minh Q Phan
(74) *Attorney, Agent, or Firm* — Van Hoven PC; Stefan D. Osterbur; Joshua Van Hoven

(57) ABSTRACT

A shape memory alloy (SMA) actuator (100) for a camera assembly, comprising:—a support structure supporting an electronic component, wherein the electronic component is susceptible to interference caused by magnetic flux; —a moveable part moveable relative to the support structure; one or more SMA components (12) connected between the moveable part and the support structure, wherein the one or (Continued)

more SMA components are configured to, on contraction, drive movement of the movable part; —a first electrical path and a second electrical path defined between, and/or including, each of the one or more SMA components (12) and respective electrical terminals (3a); and wherein the first and second electrical paths of each of the one or more SMA components are configured to, at least in part, extend adjacently to and in parallel with each other, and enabling the electrical current in the respective paths to flow in opposite directions, so as to minimise combined magnetic flux from the first and second electrical paths into the electronic component.

20 Claims, 14 Drawing Sheets

(56) References Cited

OTHER PUBLICATIONS

International Search Report and Written Opinion of PCT/GB2021/050741 dated Aug. 2, 2021.

\* cited by examiner (C)

SHAPE MEMORY ALLOY ACTUATOR

CROSS-REFERENCE TO RELATED APPLICATIONS

This application is a national stage application under 35 U.S.C. § 371 of International Application No. PCT/GB2021/050741, filed Mar. 26, 2021, which claims priority of GB Patent Application No. 2004435.0, filed Mar. 26, 2020, the disclosures of each of which are hereby incorporated by reference herein in their entireties.

FIELD

The present invention generally relates to a shape memory alloy (SMA) actuator, more specifically, the present invention relates to an SMA actuator for a camera assembly.

BACKGROUND

Cameras provided in consumer electronic devices such as smartphones and tablet computers often incorporate an electro-mechanical actuator. Such an actuator may drive movement of a lens relative to an image sensor, for example to provide zoom, to adjust a focus position of the lens as part of an autofocus (AF) system, and/or to perform optical image stabilization (OIS). To achieve accurate positioning of the movable lens, such actuators are typically driven with a linear current feed. However, the use of such drives is inefficient. Alternatively, power consumption can be reduced if PWM drive signals are used. However, it is known that the use of a PWM drive circuit for driving an electro-mechanical actuator interferes with the image sensor of the camera, typically causing artefacts to appear in the resulting digital image such as a faint but noticeable horizontal lines or speckle.

This problem of interference is particularly pronounced in shape memory alloy (SMA) actuators where one or more SMA wires are employed to drive movement of the lens relative to the image sensor. Compared to other actuation techniques, an SMA actuator provides high actuation force in a compact physical configuration, and is capable of providing focusing of the image formed on the image sensor and/or OIS. In the case of an SMA actuator, it is desirable to use a PWM drive signal.

Various attempts have been made to reduce or eliminate interference, whilst maintaining use of the actuators driven by a PWM drive signal. For example, U.S. Pat. No. 9,654,689 discloses one such example where two electrical drive circuits are attached to a voice coil motor (VCM) electro-mechanical actuator, a PWM drive circuit and a linear drive circuit. The linear circuit is used during the readout phase of operation of the image sensor, and the PWM drive circuit is used during the integration phase of operation of the image sensor. In an alternative approach, WO2018/015762 discloses the provision of a screening component positioned between the conductive components of the actuator and the image sensor.

SUMMARY

While the prior art methods are effective in reducing image noise, there are undesirable drawbacks. For example, both U.S. Pat. No. 9,654,689 and WO2018/015762 may increase the cost and complexity of the actuator drive circuit and/or assembly process. Furthermore, the method of U.S. Pat. No. 9,654,689 may reduce the power efficiency of the device, whereas the approach as disclosed in WO2018/015762 increases the height of the actuator.

The present invention provides an SMA actuator having an arrangement where the electrical connections to an SMA component, or between plural SMA components, or between current loops, are configured to cancel out or minimise their combined magnetic flux. Thus, not only is the PWM interference much reduced, the drawbacks in the prior art methods may no longer be present. Furthermore, the present invention provides a crimp fret for improving accuracy and efficiency during assembly of the SMA actuator.

According to a first aspect of the present invention, there is provided a shape memory alloy (SMA) actuator for a camera assembly, comprising:

a support structure supporting an electronic component extending along a plane orthogonal to a primary axis, wherein the electronic component is susceptible to interference caused by magnetic flux;

a moveable part moveable relative to the support structure;

one or more SMA components connected between the moveable part and the support structure, wherein the one or more SMA components are configured to, on contraction, drive movement of the movable part;

a first electrical path and a second electrical path defined between, and/or including, each of the one or more SMA components and respective electrical terminals; and wherein the first and second electrical paths of each of the one or more SMA components are configured to, at least in part, extend adjacently to and in parallel with each other, and enabling a majority of electrical current in the respective paths to flow in opposite directions, so as to minimise combined magnetic flux from the first and second electrical paths into the electronic component.

The majority of electrical current flow in an electrical path may means at least two thirds, or at least 80%, or at least 90% or substantially all of the electrical current flow.

The actuator assembly may be a micro-actuator for a camera or a mobile phone, wherein the moveable part may be a lens carriage. The lens carriage may comprise a lens having an optical axis, or the primary axis.

The SMA component may be a strip, or a rod formed from SMA materials. Preferably, the SMA component comprises a length of SMA wire connecting the support structure and the moveable part. Thus, the SMA actuator may comprise one or more lengths of SMA wire connected between the moveable part and the support structure for enabling at least one of zoom, autofocus (AF) and optical image stabilisation (OIS). For example, the one or more lengths of SMA wire may extend in a direction substantially orthogonal to the optical axis. Such an arrangement may provide the camera assembly with optical image stabilisation (OIS) capabilities. The lengths of SMA wire may extend in different directions along the plane and substantially perpendicular to each other. In some embodiments, the one or more lengths of SMA component may extend in a direction substantially angled to the plane. For example, in an SMA actuator that employs eight lengths of SMA wire (see WO2011/104518), the contraction of SMA components may cause the lens carriage to move relative to the image sensor with six degrees of freedom.

The length of SMA wire may be formed from any suitable shape memory alloy material, typically a nickel-titanium alloy (e.g. Nitinol), which may also contain tertiary components such as copper. The lengths of SMA actuator wire may have any cross-sectional profile and diameter suitable for the application. For example, the SMA wire may have a cross section diameter of 25 μm capable of generating a maximum force of between 120 mN to 200 mN whilst maintaining the strain in the SMA wire within safe limits (e.g. 2-3% reduction in length over original length). Increasing the diameter of the SMA wire from 25 μm to 35 μm approximately doubles the cross-sectional area of the SMA wire and thus approximately doubles the force provided by each SMA wire.

Preferably, the electrical currents are delivered, through the first and second electrical path, by pulse width modulated (PWM) control signals with a fixed PWM frequency. Advantageously, the use of PWM drive signal may lead to more accurate positioning of the lens carriage, as well as improved power distribution amongst the SMA wires. However, the use of PWM drive signal may be considered to be the source of electromagnetic interference.

The first electrical path and the second electrical path may be electrically conductive components in the SMA actuator that, on their own, may cause electromagnetic interference at the image sensor. The first electrical path and the second electrical path may comprise a part or all of the SMA component and/or electrical connection. The first electrical path may electrically connect the SMA component with a respective electrical terminal for conducting a PWM drive signal, whereas the second electrical path may electrically connect the SMA component with a ground terminal common for all second electrical paths in the SMA actuator.

The electronic component may comprise an image sensor, or any other electronic component that is susceptible to interference caused by magnetic flux. Preferably, the electronic component is an image sensor.

The first and second electrical paths extend in opposite sense proximally to the electronic component around the electronic component when viewed along the primary axis, and/or on the sides the electronic component when viewed along the plane. In some embodiments where the image sensor is suspended from the support structure, the electrical paths may extend in between the image sensor and the support structure, e.g. underneath the image sensor along the primary axis/optical axis. In other embodiments where the moveable part comprises a lens carriage, the electrical paths may extend above the lens carriage and/or the image sensor along the primary axis/optical axis, in a way that they do not obstruct the optical path to the image sensor.

In some embodiments, the first and second electrical paths may allow at least 90% of electrical current in the respective paths to flow in opposite directions, so as to minimise combined magnetic flux from the first and second electrical paths into the electronic component. The first and second electrical paths may have electrical currents of substantially the same amplitude flowing in opposite direction, so as to minimise or to cancel combined magnetic flux from the first and second electrical paths into the electronic component.

In a preferred embodiment, the SMA component may form part of the second electrical path. Thus, the first electrical path may be configured to, at least in part, extend adjacently to and in parallel with at least a part the SMA component and the second electrical path. In other embodiments, the SMA component may form part of the first electrical path. Thus, the second electrical path may be configured to, at least in part, extend adjacently to and in parallel with at least a part of the SMA component and the first electrical path. In another embodiment, each of the first electrical path and the second electrical path comprises an SMA component, wherein the SMA components are serially connected and extend adjacently to and parallel with each other. Thus, the two serially connected SMA components and/or their respective electrical paths, may be configured to, at least in part, extend adjacently to and in parallel with each other.

Optionally, the one or more SMA components comprises plural SMA components each disposed on a respective side of the image sensor. For example, the SMA actuator may comprise four SMA components each provided on a side of the image sensor. Such an arrangement may allow the moveable part to move in all directions in the plane of the image sensor.

Optionally, the second electrical path comprises an electrically conductive flexure extending between the support structure and the moveable part, wherein the electrically conducive flexure is configured to provide electrical communication between each of the one or more SMA components and a common terminal. The common terminal may be a ground terminal, or it may be any other terminal. More specifically, the electrically conductive flexure may enable electrical communication between the SMA component and the common terminal along the primary axis. Optionally, the electrically conductive flexure is arranged such that the second electrical path is, at least in part, extending adjacently and in parallel to the respective first electrical path of each of the one or more SMA components. Advantageously, there may be one or more second electrical paths provided on the flexure each dedicated for a respective SMA component. Optionally, the electrically conductive flexure comprises flexible arm portions biasing against the moveable part and the support structure, the flexible arm portions are connected to a flexure body having at least two conductive paths, wherein the electrical break is formed across one of the conductive paths, thereby providing for a unidirectional current flow along the other of the conductive paths. The electrical break may be a physical gap or an electrical insulation extending along one of the at least two conductive paths. Advantageously, such an arrangement may allow the plural second electrical paths to be positioned adjacent to their respective first electrical paths.

Optionally, the electrically conductive flexure comprises separate flexible arms biasing against the moveable part and the support structure, each of flexible arms is arranged to form a second electrical path for a respective SMA component and, at least in part, extending adjacently and in parallel to the respective first electrical path of the said respective SMA component. More specifically, the flexible arms each forms a dedicated second electrical path for the respective SMA component such that the second electrical path can routed in a desired manner.

Optionally, the first electrical path of the SMA component comprising an electrically conductive layer provided on the support structure, and insulated from the electrically conductive flexure, wherein the electrically conductive layer is arranged such that the first electrical path is, at least in part, extending adjacently and in parallel to the respective second electrical path. More specifically, the second electrical path and the first electrical path of the SMA component may extend on different planes along the primary axis, where their close proximity may provide effective reduction of magnetic flux around the image sensor. Advantageously, such an arrangement may result in improved flexibility in actuator design. Optionally, the electrically conductive layer and the respective electrical terminal are stacked along the primary axis.

Optionally, the electrically conductive layer having at least two conductive paths, wherein the electrical break is formed across one of the conductive paths, thereby providing for a unidirectional current flow along the other of the conductive paths. In such an arrangement, the electrical break may permit a unidirectional electrical current flow around the image sensor. Similar to the electrical break in the electrically conductive flexure, the electrical break in the electrically conductive layer may be a physical gap or an electrical insulation. Such an arrangement may advantageously divert the electrical current in the first electrical path to flow in a direction against that in SMA component and the second electrical path.

Optionally, the second electrical path further comprises an insulated electrical track connected to the common terminal, wherein the insulated electrical track is arranged such that the second electrical path is, at least in part, positioned adjacent and in parallel to the respective first electrical path of the one or more SMA component. For example, a separate electrical connector, such as a wire or flexible circuit board (FBC) may directly route the second electrical path such that it is arranged adjacently to and in parallel with the first electrical path.

Optionally, the first electrical path further comprises an insulated electrical track connected to the respective electrical terminal, wherein the insulated electrical track is arranged such that the first electrical path is, at least in part, positioned adjacent and in parallel to the respective second electrical path of the one or more SMA components. For example, a separate electrical connector, such as a wire or flexible circuit board (FBC) may directly route the first electrical path such that it is arranged adjacent to and in parallel with the second electrical path.

Optionally, the moveable part is configured to move along a direction orthogonal to the primary axis or in a direction along the primary axis.

Optionally, the one or more SMA components comprises one SMA component, two SMA components, four SMA components or eight SMA components. The SMA components may be evenly distributed on plural sides of the SMA actuator. For example, two or two pairs of SMA components may be positioned on the same side, opposite sides or two adjacent sides of the SMA actuator. Likewise, four or four pairs of SMA components may be each positioned on a respective side of the actuator. In some embodiments with 8 SMA components, each of the pairs of SMA component on the same side of the SMA actuator may be angled to the plane and each other to effect 6 degree of freedom in the moveable part.

In some embodiments, at least one SMA component may be disposed on a respective side of the electronic component, wherein the electrical terminals for each of the SMA components are positioned along a first side of the SMA actuator and, when viewed along the primary axis, each of the SMA components and their respective first and second electrical paths defines a respective area of magnetic flux. For example, each of the SMA components and their respective first and second electrical paths, as well as the corresponding terminals forms a respective PWM current loop in which a magnetic field forms. More specifically, such an area of magnetic flux may be referred to as an area into which the magnetic field penetrates. Thus, the area of magnetic flux defines a region close to which an electronic component may suffer from magnetic flux interference.

Optionally, the plural SMA components collectively, when viewed along the primary axis, define a boundary area, wherein the ratio of the boundary area to the area of magnetic flux of each SMA component is in the range of 0 to 0.5, or 0 to 0.4, or 0 to 0.35. The electronic component may be positioned within the boundary area when viewed along the primary axis. Broadly speaking, since the magnetic flux from the SMA components may overlap and combine, the maximum level of combined magnetic flux, from all of the SMA components, may be expected in the boundary area. More specifically, an SMA component having a smaller ratio is less likely to cause interference at the electronic component.

Optionally, the first and second electrical paths of each of the one or more SMA components does not form a complete current loop around the electronic component. Such an arrangement may advantageously prevent the area of magnetic flux from extending across the electronic component.

Optionally, the area encompassed by the first and second electrical paths when viewed along the primary axis is smaller than the area encompassed by the first and second electrical paths when viewed along any direction perpendicular to the primary axis.

Optionally, the area encompassed by the first and second electrical paths when viewed along the plane is smaller than the area encompassed by the first and second electrical paths when viewed along the primary axis.

According to a second aspect of the present invention, there is provided a shape memory alloy (SMA) actuator for a camera assembly, comprising:
  a support structure supporting an electronic component, wherein the electronic component is susceptible to interference caused by magnetic flux;
  a moveable part moveable relative to the support structure; plural SMA components connected between the moveable part and the support structure, wherein the plural SMA components are configured to, on contraction, drive movement of the movable part;
  a first electrical path and a second electrical path defined between, and/or including, each of the plural SMA components and respective electrical terminals; and
  wherein the first and second electrical paths of at least two of the plural SMA components are configured to, at least in part, extend adjacently to and in parallel with each other, and enabling the majority of electrical current in the respective paths to flow in opposite directions, so as to minimise combined magnetic flux from the first and second electrical paths into the electronic component. According to a third aspect of the present invention, there is provided a shape memory alloy (SMA) actuator for a camera assembly, comprising:
  a support structure having an electronic component, the electronic component extends along a plane orthogonal to a primary axis;
  a moveable part moveable relative to the support structure;
  an SMA component connected between the moveable part and the support structure, wherein the SMA component is configured to, on contraction, drive movement of the movable part;
  a first electrical path and a second electrical path defined between, and/or including, the SMA component and respective electrical terminals; and
  wherein the first and second electrical paths of the SMA component are configured to, at least in part, extend adjacently to and in parallel with each other around at least two sides of the image sensor when viewed along the primary axis, and enabling the majority of electrical current in the respective paths to flow in opposite directions, so as to minimise combined magnetic flux from the first and second electrical paths into the electronic component.

According to a fourth aspect of the present invention, there is provided a shape memory alloy (SMA) actuator for a camera assembly, comprising:
a support structure supporting an electronic component, wherein the electronic component is susceptible to interference caused by magnetic flux;
a moveable part moveable relative to the support structure; plural SMA components connected between the moveable part and the support structure, wherein the plural SMA components are configured to, on contraction, drive movement of the movable part;
respective electrical path defined between, and/or including, each of the plural SMA components and respective electrical terminals; and
wherein the electrical paths of the plural SMA components are configured to, at least in part, extend adjacently to and in parallel with each other, and enabling electrical current in the electrical paths to flow in opposite directions, so as to minimise combined magnetic flux from the electrical paths into the electronic component.

For example, the first and second electrical paths of each of plural SMA components may not extend adjacently to and in parallel with each other. Thus, on their own they may each form a current loop that induces a level of combined magnetic flux that causes interference at the electronic component. However, when two or more of such current loops are extending, at least in part, adjacently and in parallel to each other, with electrical current flowing in opposite directions, a cancelling effect similar to that in first to third aspect may arise. The electronic component and electrical paths may be stacked or extend along the same plane along a primary axis. The electrical current in the two or more current loops may not necessarily need to be identical, since the two SMA components in the current loops may be actuated at different rates.

According to a fifth aspect of the present invention, there is provided an SMA actuator, comprising:
a support structure;
a moveable part moveable relative to the support structure;
plural first crimps attached to one of the support structure and the moveable part;
one or more second crimps attached to the other of the support structure and the moveable part;
plural SMA components extending adjacently and in parallel to each other, wherein the first ends of the each of the plural SMA components are electrically connected to respective first crimps and the second ends of the plural SMA components are electrically connected to the respective one or more second crimps, wherein the plural SMA components are configured to, on contraction, drive movement of the movable part.

Optionally, the plural SMA components comprise two SMA components serially connected at the second crimp and enabling electrical currents to flow in opposite directions, so as to minimise combined magnetic flux from the two SMA components.

Alternatively, the plural SMA components are separate to each other. The plural SMA components may be the same, or of different cross-sectional diameter or formed from different material.

According to a sixth aspect of the present invention, there is provided A SMA crimp fret for forming an SMA actuator of the fifth aspect, comprising: a frame connected to plural first crimps and one or more second crimps by severable connectors, wherein the frame is configured to be detached, by severing the severable connectors, from the plural first crimps and the second crimp after the said first crimps and the said one or more second crimps are attached to the SMA actuator.

Advantageously, such an arrangement may allow the SMA components to be crimped on to their respective crimps prior to assembling onto the SMA actuator, thus significantly simplifying the assembly process. Moreover, since the plural first crimps and the second crimp are presented with predetermined spacing in the frame, a precise length of SMA component may be crimped between the first and second crimps.

According to a seventh aspect of the present invention, there is provided a method of forming the SMA actuator according to the fifth aspect with the SMA crimp fret of the sixth aspect, comprising:
attaching the plural first crimps of the SMA crimp fret to the SMA actuator;
attaching the one or more second crimps of the SMA crimp fret to the SMA actuator;
severing the severable connectors; and
removing the frame from the SMA actuator.

Features from the first aspect, the second aspect, the third aspect, the fourth aspect, the fifth aspect, the sixth aspect and the seventh aspect of the present invention may be interchangeable with each other.

BRIEF DESCRIPTION OF THE DRAWINGS

Certain embodiments of the invention will now be described, by way of example only, with reference to the accompanying drawings, in which.

DETAILED DESCRIPTION

Figure 1:
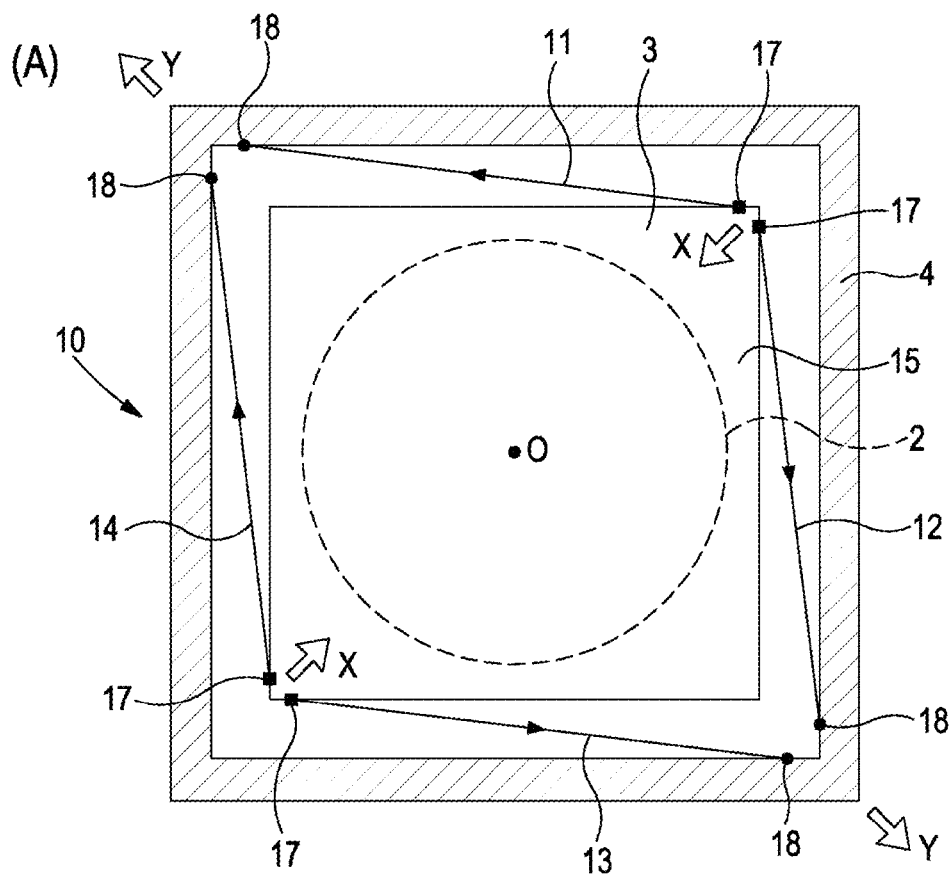
FIGS. 1A, 1B and 1C respectively show a plan schematic diagram, a perspective view and an exploded perspective view of an SMA assembly according to an example embodiment.
FIGS. 1D and 1E show plan views of a support structure and support component of the SMA assembly according to the example embodiment.
Figure 1:
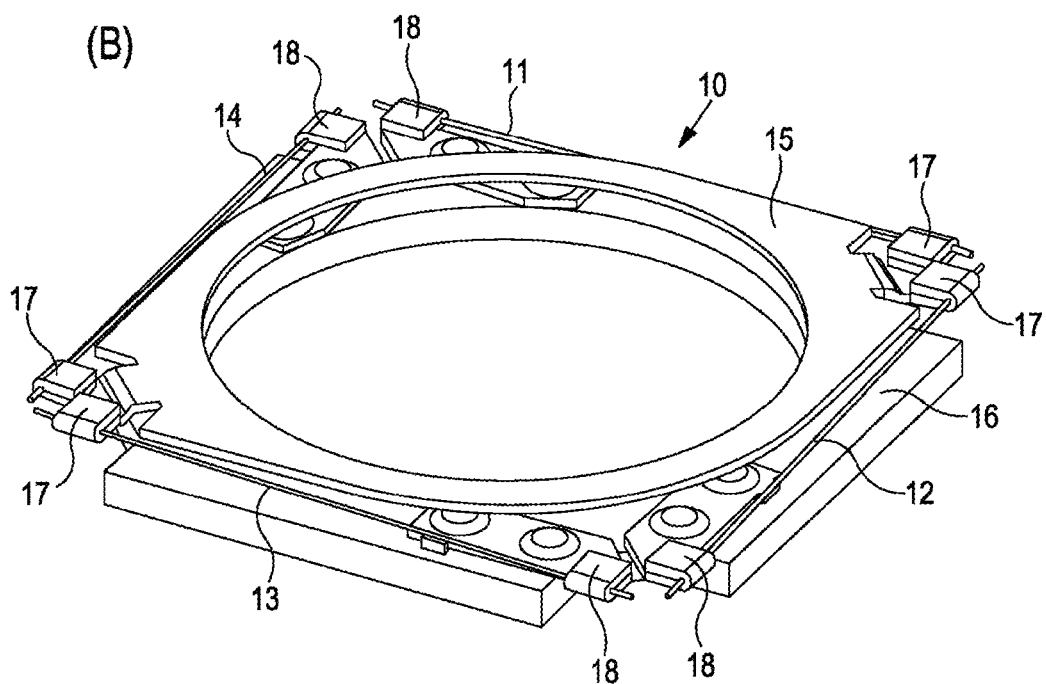
Figure 1:
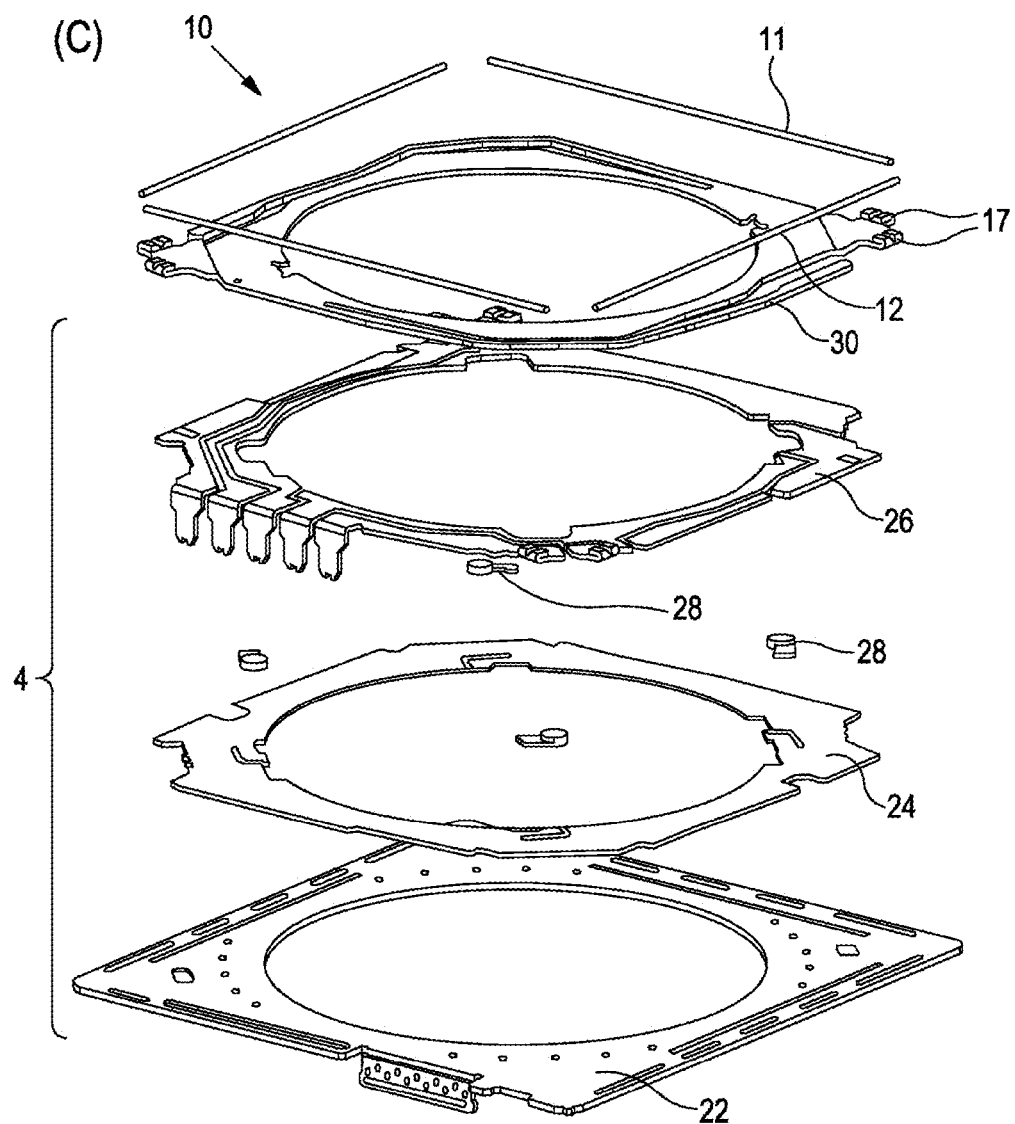
Figure 1:
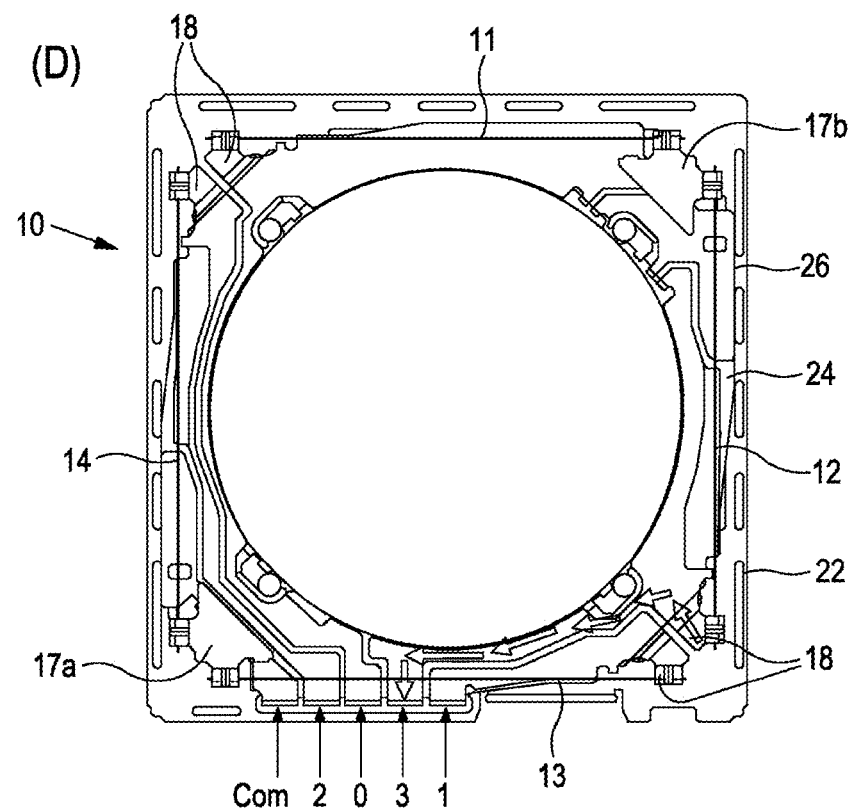
Figure 1:
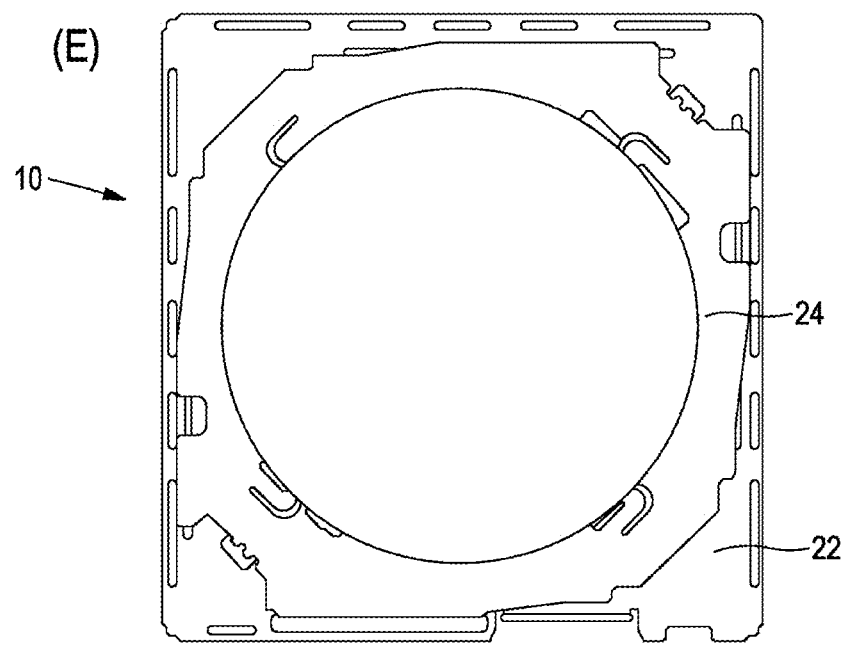

FIGS. 1A, 1B and 1C respectively show a plan schematic diagram, plan view and exploded perspective view of a SMA assembly according to an example embodiment. As shown in FIG. 1A, the lens element 2, mounted on a moveable part 15, is configured to move linearly in two orthogonal directions, both perpendicular to the optical axis O which may be termed "shift" or "OIS-shift". The resulting image compensation does not necessarily completely reverse the effects of user handshake, but the performance may be deemed to be sufficiently good.

Each of the SMA actuator wires 11 to 14 is arranged along one side of the lens element 2. Thus, the SMA actuator wires 11 to 14 are arranged in a loop at different angular positions around the optical axis O. Thus, the four SMA actuator wires 11 to 14 consist of a first pair of SMA actuator wires 11 and 13 arranged on opposite sides of the optical axis O and a second pair of SMA actuator wires 12 and 14 arranged on opposite sides of the optical axis O. The first pair of SMA actuator wires 11 and 13 are capable on selective driving to move the lens element 2 relative to the support structure 4 in a first direction in said plane, and the second pair of SMA actuator wires 12 and 14 are capable on selective driving to move the lens element 2 relative to the support structure 4 in a second direction in said plane transverse to the first direction. Movement in directions other than parallel to the SMA actuator wires 11 to 14 may be driven by a combination of actuation of these pairs of the SMA actuator wires 11 to 14 to provide a linear combination of movement in the transverse directions. Another way to view this movement is that simultaneous contraction of any pair of the SMA actuator wires 11 to 14 that are adjacent each other in the loop will drive movement of the lens element 2 in a direction bisecting those two of the SMA actuator wires 11 to 14 (diagonally in FIG. 1A, as labelled by the arrows X and Y).

As a result, the SMA actuator wires 11 to 14 are capable of being selectively driven to move the lens element 2 relative to an image sensor extending on the support structure 4 to any position in a range of movement in two orthogonal directions perpendicular to the optical axis O. The magnitude of the range of movement depends on the geometry and the range of contraction of the SMA actuator wires 11 to 14 within their normal operating parameters.

The actuator arrangement 10 comprises a total of four SMA actuator wires 11 to 14 connected between a support component 16 that forms part of the support structure 4 and a movable part 15 that forms part of the lens element 2 and is mounted to the rear of the lens plate.

Each of the SMA actuator wires 11 to 14 is held in tension, thereby applying a force between the movable part 15 and the support component 16 in a direction perpendicular to the optical axis O. In operation, the SMA actuator wires 11 to 14 move the lens element 2 relative to the support component 16 in two orthogonal directions perpendicular to the optical axis O.

The SMA actuator wires 11 to 14 are connected at one end to the movable part 15 by respective crimps 17 ('moveable crimps') and at the other end to the support component 16 by crimps 18 ('static crimps'). The crimps 17 and 18 crimp the wire to hold it mechanically, optionally strengthened by the use of adhesive. The crimps 17 and 18 also provide an electrical connection to the SMA actuator wires 11 to 14. However, any other suitable means for connecting the SMA actuator wires 11 to 14 may alternatively be used.

FIG. 1C shows a exploded perspective view of the SMA assembly of FIGS. 1A and 1B. The SMA actuator 10 comprises a support structure 4 comprising a support component 24 and a conductive component 26. Bearings 28 are attached to support component 24. The support component 24 is attached to a base layer 22 as shown in FIG. 1E. The SMA actuator 10 comprises a flexure plate 30. The flexure plate 30 is connected to movable crimps 17. The flexure plate 30 is held in contact with the bearings 28 by flexure arms, such that the flexure plate 30 (and therefore the moveable part 15) is moveable relative to the support structure 4. The SMA actuator 10 comprises SMA actuator wires 11 to 14, which are each attached at one end to moveable crimps 17 and at another end to static crimps 18 of the conductive component 26.

In the exemplified embodiment, the support component 24 may have a laminate structure, comprising an electrically insulative material provided on a metal structural layer, and the metallic bearings or polymer bearing 28 may be attached to the support component 24 by adhering the bearings 28 to the electrically insulative material. The bearings 28 may be integrated bearings. The metal structural layer may be formed of steel or stainless steel. The structural layer may have a thickness of less than or equal to 50 μm. The electrically insulative layer may be a polymer, such as parylene/a parylene polymer/ceramic coating such as titanium carbide or diamond like carbon (DLC). The electrically insulative layer may have a thickness of less than or equal to 10 μm. In some cases, the electrically insulative material may be provided on both sides of the structural layer.

The bearings 28 may be coated with a friction-reducing or low-friction coating. For example, the bearings 28 may be coated with any one of: a lubricant, a dry film lubricant, a diamond-like carbon coating, and hard chrome. Alternatively, a surface of the bearings 28 which contacts the spring plate of the moveable component may be polished (by a mechanical polishing process, electro-polishing process or chemical polishing process).

FIG. 1D shows the electrical paths of the example SMA actuator 10. In FIG. 1D, four electrical terminals 0, 1, 2 and 3 are provided at the conductive component 26. Each of the electrical terminals 0, 1, 2, 3 is electrically connected to a respective static crimp 18 through respective first electrical path on the conductive component 26. For example, SMA wire 11 is connected to terminal 0, SMA wire 12 is connected to terminal 3, SMA wire 13 is connected to terminal 1 and SMA wire 14 is connected to with terminal 2. There is also provided a ground terminal Com, connected to both moveable crimps 17a, 17b by the flexure plate (not shown), as such provides second electrical paths for each of the SMA wires 11 to 14.

However, such an arrangement is unfavourable due to the presence of image noise. Using SMA wire 12 as an example, the second current path extends from common ground terminal Com, through the flexure plate, to and including the SMA wire 12 by moveable crimp 17b. The corresponding first current path on the other hand, extends from static crimp 18 to electrical terminal 3 (illustrated by means of arrows in FIG. 1D). More specifically, when view along the optical axis O, the first current path, second current path, and the SMA wire 12 do not extend adjacently to and in parallel with each other anywhere along the current path. Instead, the two electrical paths form a full current loop flowing around the SMA actuator 10. Such an arrangement may cause a high level of magnetic flux at the image sensor, thus leading to high image noise values.

Figure 2:
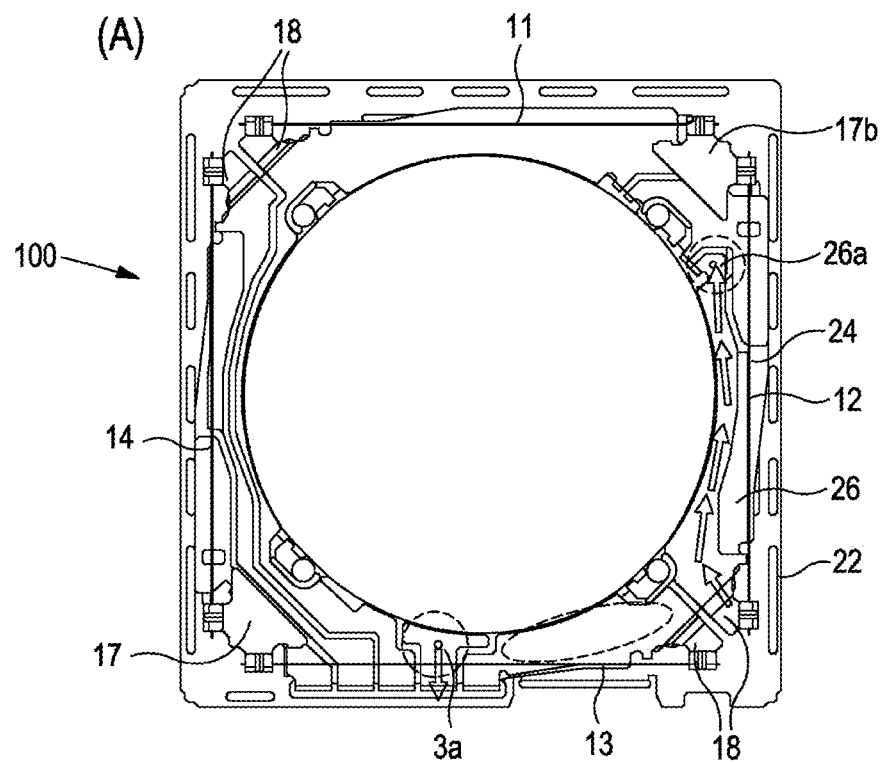
FIGS. 2A and 2B show plan views of a support structure and support component of an SMA assembly according to a first embodiment of the present invention.
Figure 2:
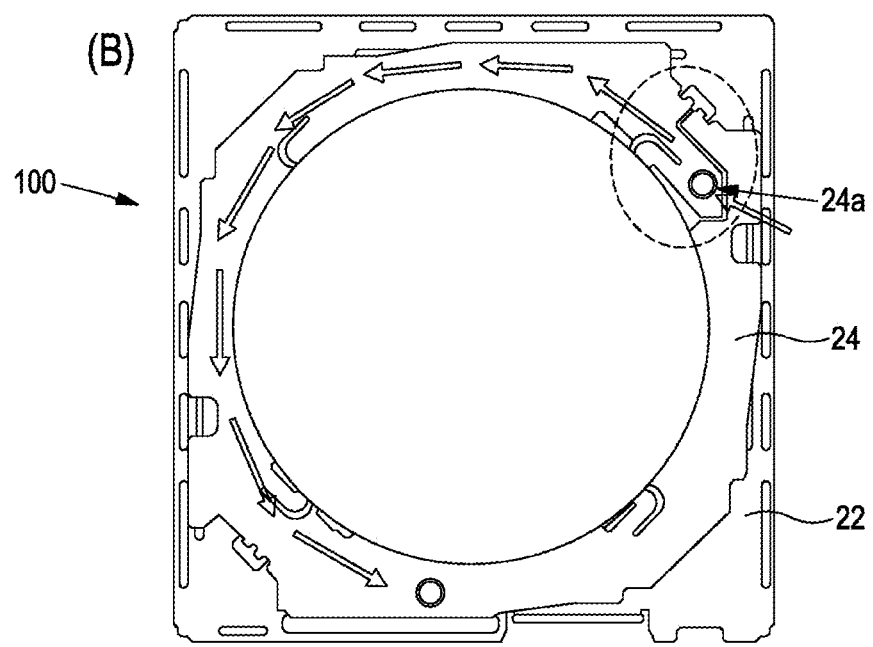

FIGS. 2A and 2B respectively show plan views of a support structure and support component of an SMA actuator 100 according to a first embodiment of the present invention. The actuator 100 is structurally and functionally similar to the example embodiment 10 of FIG. 1. The SMA actuator 100 differs from the example embodiment 10 in that it comprises a modified first electrical path for the SMA wire 12 (illustrated by means of arrows). Such an arrangement allows the entire first electrical path to extend adjacent to, and in parallel to the SMA wire 12 and second electrical path.

Figure 3:
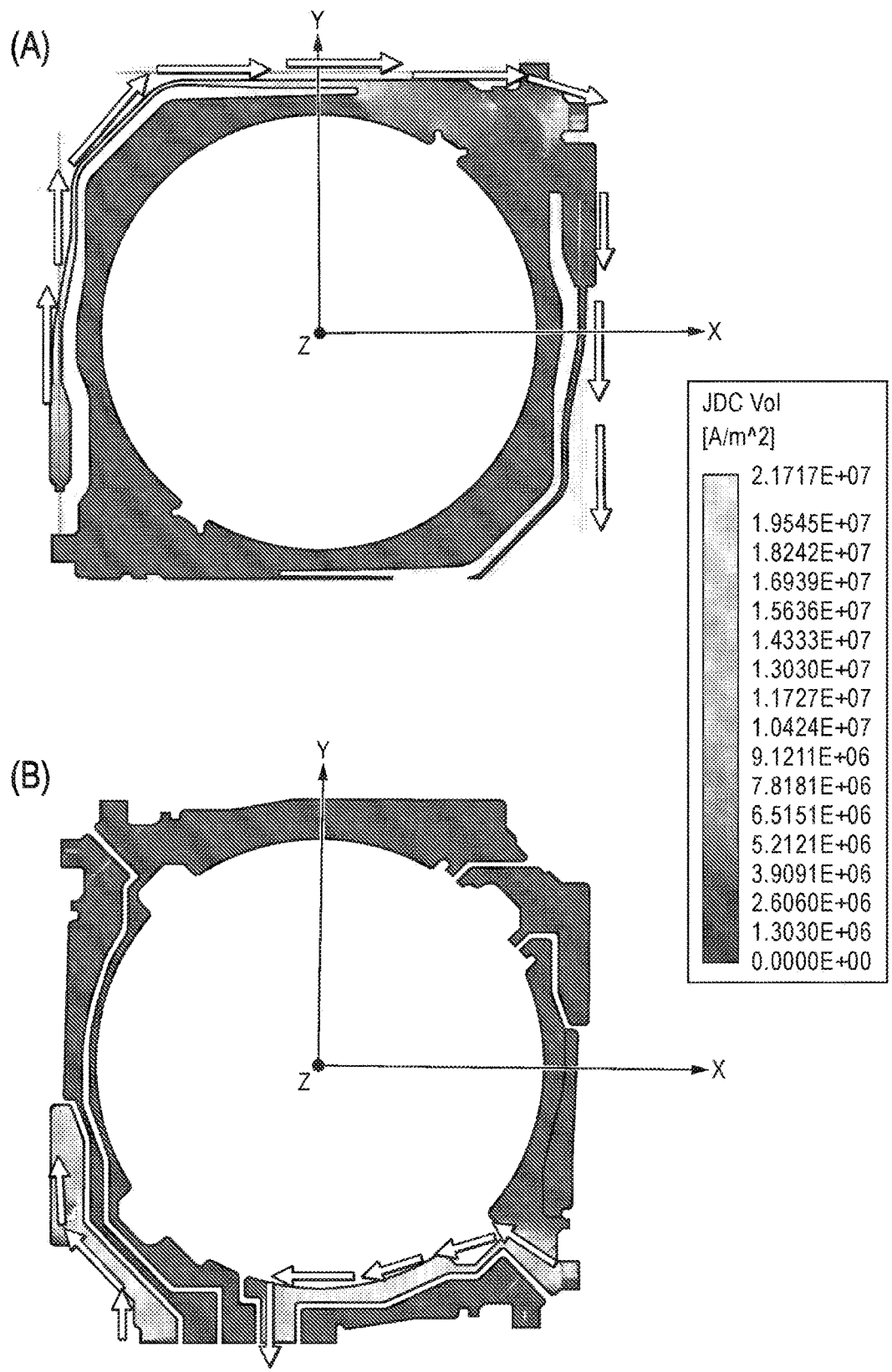
FIGS. 3A and 3B show current density plots of a flexure plate and the conductive component of the example embodiment.
FIGS. 3C and 3D show current density plots of a flexure plate and the support component of the SMA assembly of FIGS. 2A and 2B.
Figure 3:
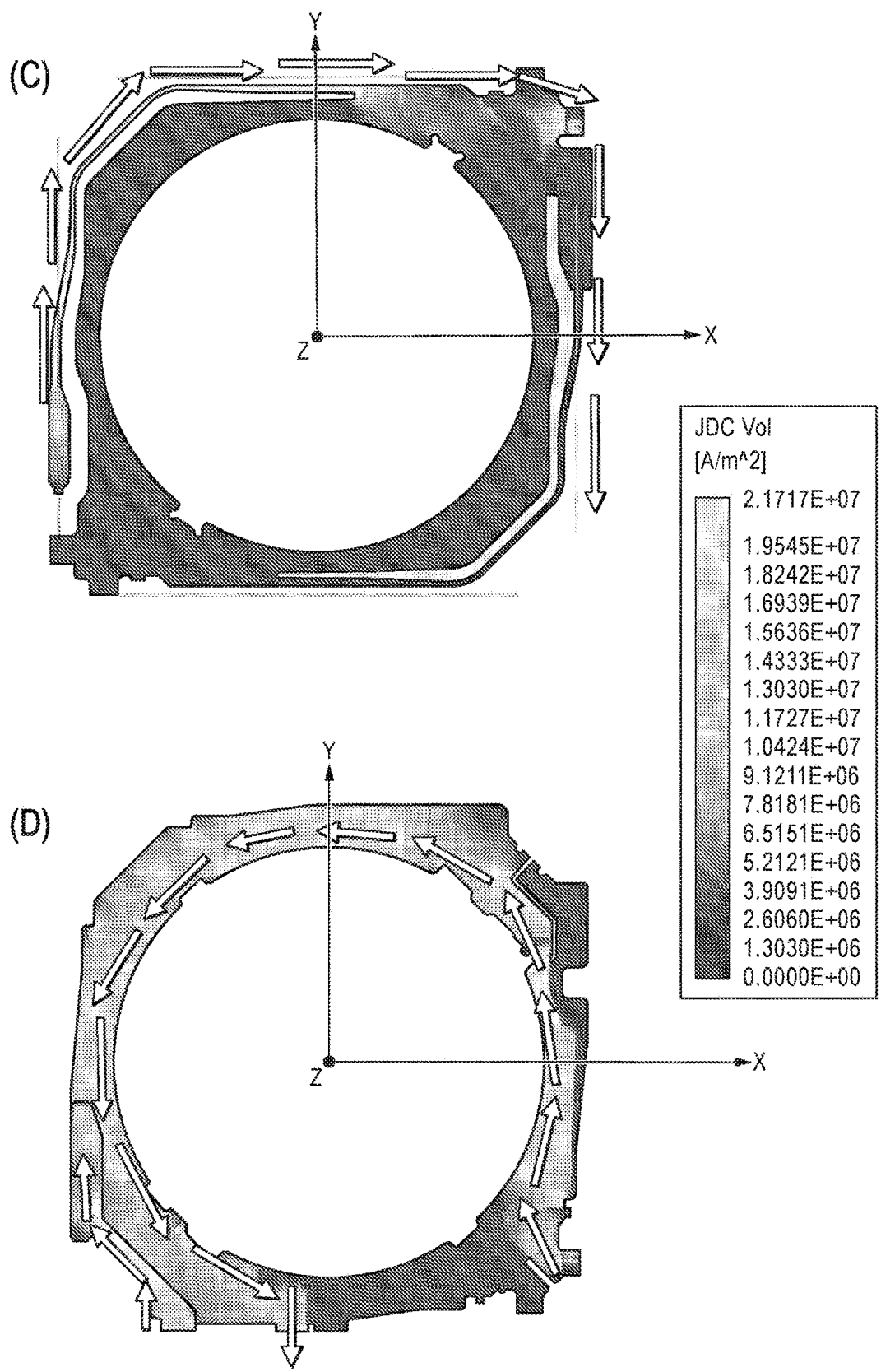

Instead of running the first electrical path in a clockwise direction as shown in FIG. 1D, the SMA actuator 100 comprises a portion of the conductive component 26a that is physically detached from terminal 3a. More specifically, a conductive layer or an exposed steel plate is provided on the support component 24, to which the portion of the conductive component 26a and the electrical terminal 3a are welded. The said conductive layer, or exposed steel plate, comprises an electrical break 24a, which may be readily formed by modifying the steel etching lithography. Such an arrangement diverts the first electrical path to flow unidirectionally in a counter-clockwise direction, and thus permits electrical current in the first electrical path to flow against that in the SMA wire 12 and the second electrical path (along the flexure plate 30). Advantageously, the two magnetic fluxes of the electrical paths may cancel out, or at least minimise the magnetic flux around the image sensor. The benefit may be visualised in a side-by-side current density plot as shown in FIG. 3.

FIGS. 3A and 3B respectively shows a current density plot of the flexure plate 30 and the conductive component 26 of the example embodiment, whereas FIGS. 3C and 3D show current density plots of the flexure plate 30 and the conductive layer on the support component 24 as illustrated FIGS. 2A and 2B. Since the same flexure plate 30 arrangement is used in both the example embodiment 10 and the SMA actuator 100, the current densities as shown in FIGS. 3A and 3C are visually identical.

It is clearly shown in FIG. 3B that there is an exceptionally high level of current density in the portion of conductive component 26 connecting the static crimp 18 and the electrical terminal 3. Moreover, the regions with high current density in the conductive component 26 and the corresponding flexure plate 30 of the example embodiment 10 do not extend adjacently and in parallel with each other. Thus, a high level of magnetic flux is expected around and into the image sensor.

On the other hand, FIG. 3D shows a well distributed current density over the conductive layer at the support component 16. More importantly, the counter-clockwise current flow in the first electrical path is shown extending adjacently along the full length of SMA wire 12, as well the second current path on the flexure plate 30. Thus, the magnetic flux into image sensor region may be cancelled, or at least minimised.

The use of parallelly extending first and second electrical paths may be particularly beneficial in camera assemblies. For example, the arrangement as shown in the example embodiment 10 in FIG. 1C requires electrical paths to extend around the lens aperture or the image sensor. Doing so may undesirably form a complete current loop around the image sensor, thus an area of magnetic flux may present directly around or above the image sensor.

Figure 9:
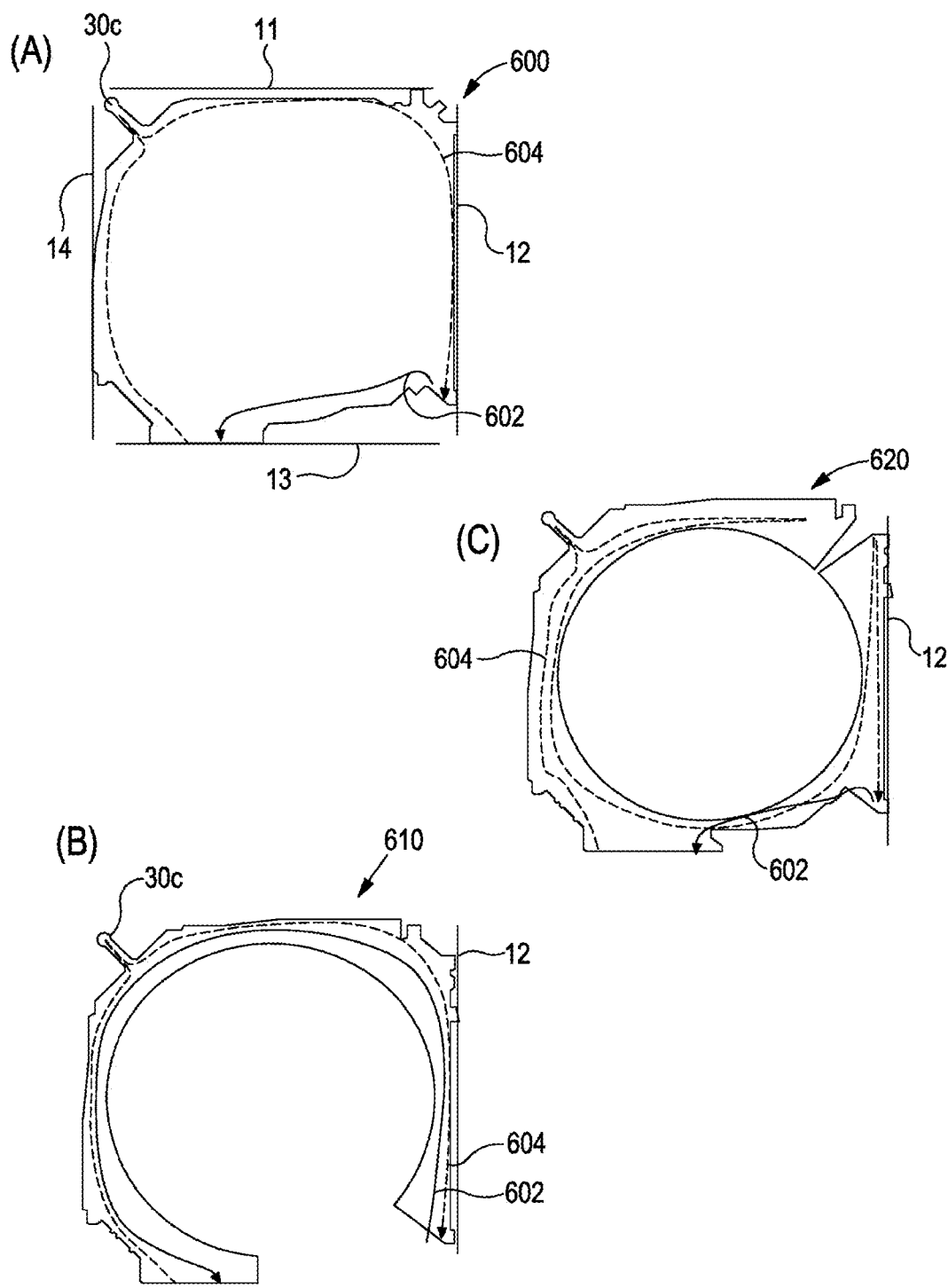
FIGS. 9A, 9B and 9C are perspective illustrations respectively showing area of magnetic flux of an SMA wire of the example embodiment of FIG. 1D, the SMA actuator of FIG. 2A and the SMA actuator of FIG. 4B.

Further illustrated in FIG. 9A is an area of magnetic flux of an SMA actuator 600 (as viewed along the primary axis O), caused by the first and second electrical paths of SMA wire 12. The SMA actuator 600 is identical to the example embodiment 10 except it is provided with kinked flexure arms 30c on its flexure plate. It is shown that the area of magnetic flux in SMA actuator 600 encompass the components, e.g. flexure plate and electrical conductive component, that forms the first and electrical paths. In addition, because the electrical paths of SMA wire 12 forms a current loop around the lens carriage or the image sensor, the area of magnetic flux extends over the image sensor (e.g. an orifice opened in the conductive component).

For the purpose of normalisation, the area of magnetic flux may be divided by a boundary area defined by the SMA wires 11, 12, 13, 14 as viewed along the primary axis. The boundary area, in fact, is a three dimensional volume, but since the SMA wires extend substantially orthogonally perpendicular to primary axis, e.g. the extent of SMA wires along the primary axis is small compared to that in the orthogonal direction, such volume may be approximated two-dimensional by the boundary area. The resulting ratio represents the area of magnetic flux for a particular SMA wire corresponding to a region within which a magnetic field, or maximum level of magnetic flux exist. Thus, the smaller the ratio, the less likely an SMA wire will cause interference at the image sensor.

In the example embodiment 600, the boundary area as defined by the SMA wires 11, 12, 13, 14 covers an area of 233 mm$^2$ when viewed along the primary axis, wherein the area of magnetic flux for SMA wire 12 covers an area of 215 mm$^2$. Thus, ratio of the boundary area to the area of magnetic flux of SMA wire 12 is taken to be 0.92.

Figure 4:
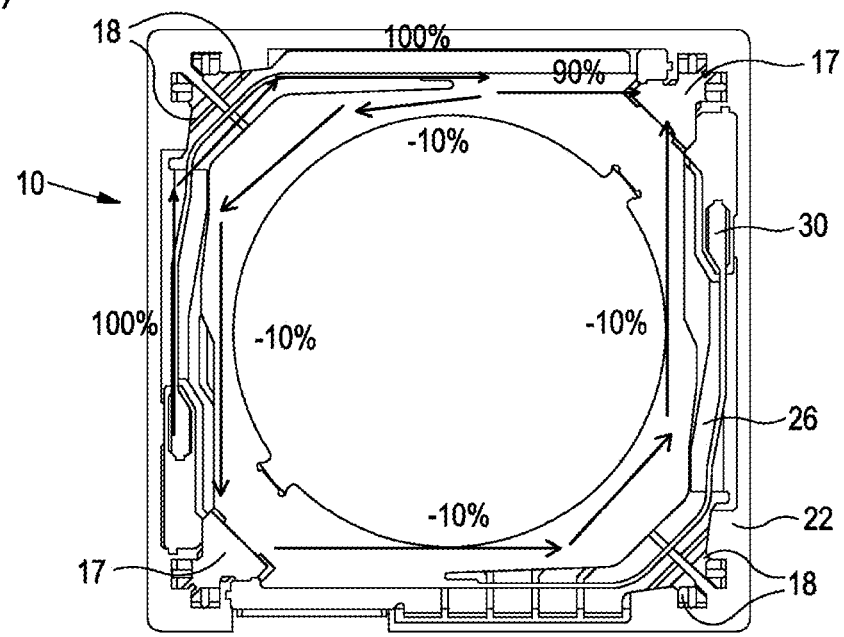
FIGS. 4A and 4B show respective percentage current flow along flexure plates of the example embodiment and an SMA assembly according to a second embodiment of the present invention.
Figure 4:
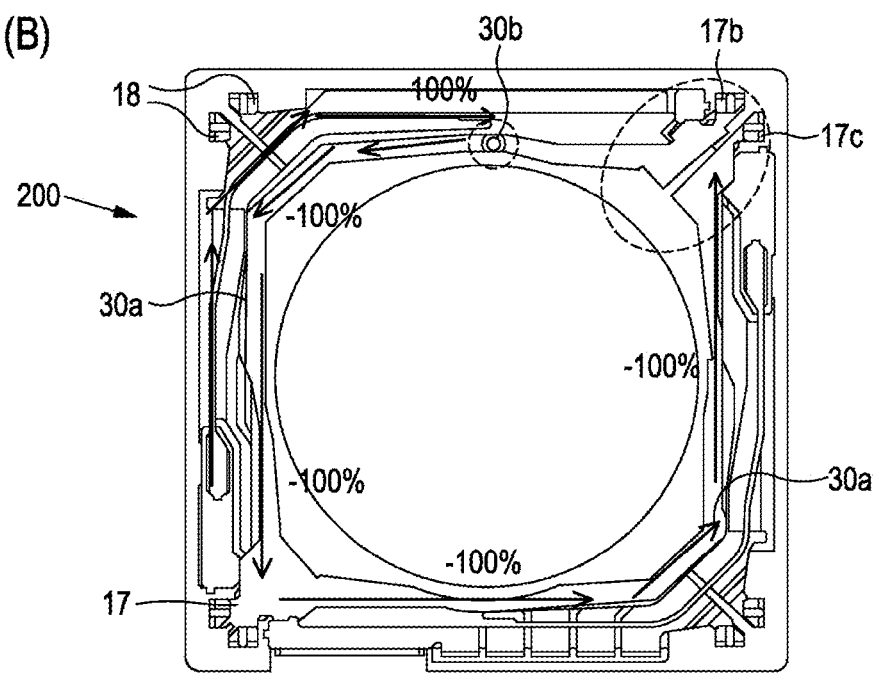

FIG. 9B shows an area of magnetic flux of an SMA actuator 610 (as viewed along the primary axis O), caused by the first and second electrical paths of SMA wire 12. The SMA actuator 610 is identical to the SMA actuator 100 except it is provided with kinked flexure arms 30c on its flexure plate. Similar to the SMA actuator 100 of FIG. 2B, the first electrical path 602 extends on a conductive layer on the respective support structure and in an anticlockwise direction around the image sensor. Thus, the first and second electrical paths 602, 604 in the SMA actuator 610 extends adjacently and in parallel to each other, as well as having current flow in opposite directions. In other words, there is no complete current loop around the image sensor. This effectively limits the area of magnetic flux from SMA wire 12 to the conductive components, rather than also extending across the orifice in the conductive component as in example embodiment 600 of FIG. 9A, resulting in a much reduced ratio of the boundary area to the area of magnetic flux of SMA wire 12 of 0.28. FIGS. 4A and 4B respectively shows percentage current flow along the flexure plate of the example embodiment and an SMA actuator 200 according to a second embodiment of the present invention. The SMA actuator 200 is structurally and functionally similar to the example embodiment 10 of FIG. 1. The SMA actuator 200 differs from the example embodiment 10 in that it comprises a modified second electrical path for the SMA wire 12 (illustrated by means of arrows), whilst its first electrical path of remains the same. Such an arrangement allows the entire second electrical path to extend adjacent to, and in parallel to the SMA wire 12 and first electrical path.

In the example embodiment of FIG. 4A, it is shown that around 90% of the current flow in the flexure plate 30 takes the shortest path, e.g. in a clockwise direction. There is only 10% of the current flow circulates around the image sensor in the counter-clockwise direction, thus insufficient for cancelling magnetic flux in the first electrical path and the SMA wire 12.

Referring to the SMA actuator 200 of FIG. 4B, a dedicated conductive track 30a is laid on top of the flexure plate 30. That is, conductive track is electrically connected to the flexure plate 30 at a weld 30b and remains insulated along the length of the track 30a. The first electrical path is identical to the example embodiment 10 as shown in FIG. 1D, e.g. not extending through the conductive layer on the support structure. In this embodiment, two moving crimps 17b and 17c are respectively provided for SMA wires 11 and 12, such that the track 30a is only in connection with SMA wire 12 by the corresponding moving crimp 17c. More specifically, the track 30a unidirectionally diverts the second electrical path into a counter-clockwise direction as shown in FIG. 4B, thus ceasing electrical current circulation in the clockwise direction. Advantageously, such as arrangement may effectively reduce the magnetic flux into the image sensor because the second electrical path for SMA wire 12 allows electrical current to flow in an opposite direction to, and extends adjacently along, the entire length of the SMA wire 12, as well as the first electrical path toward electrical terminal 3.

The resulting reduction in the area of magnetic flux for SMA wire 207 is shown in FIG. 9C. The electrical break provided on the flexure plate diverts the second electrical path, thus prevents the formation of a complete current loop. Such an arrangement effectively reduces the ratio of the boundary area to the area of magnetic flux of SMA wire 12 from 0.92 in example embodiment, to a much lower value of 0.35, i.e. the area of magnetic flux of SMA wire 12 is taken to be 81 mm$^2$.

Figure 5:
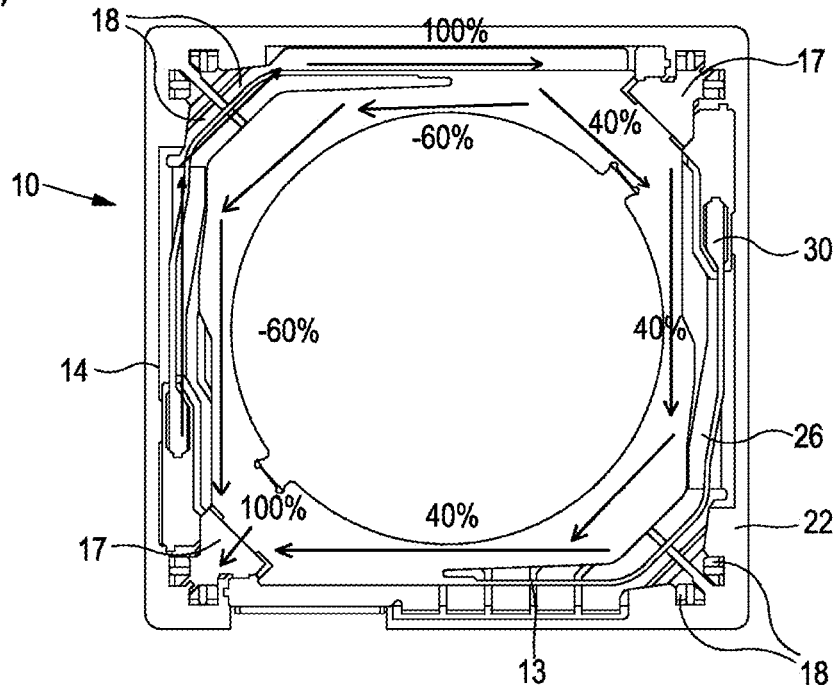
FIGS. 5A and 5B show respective percentage current flow along a flexure plate of the example embodiment and an SMA assembly according to a third embodiment of the present invention.
Figure 5:
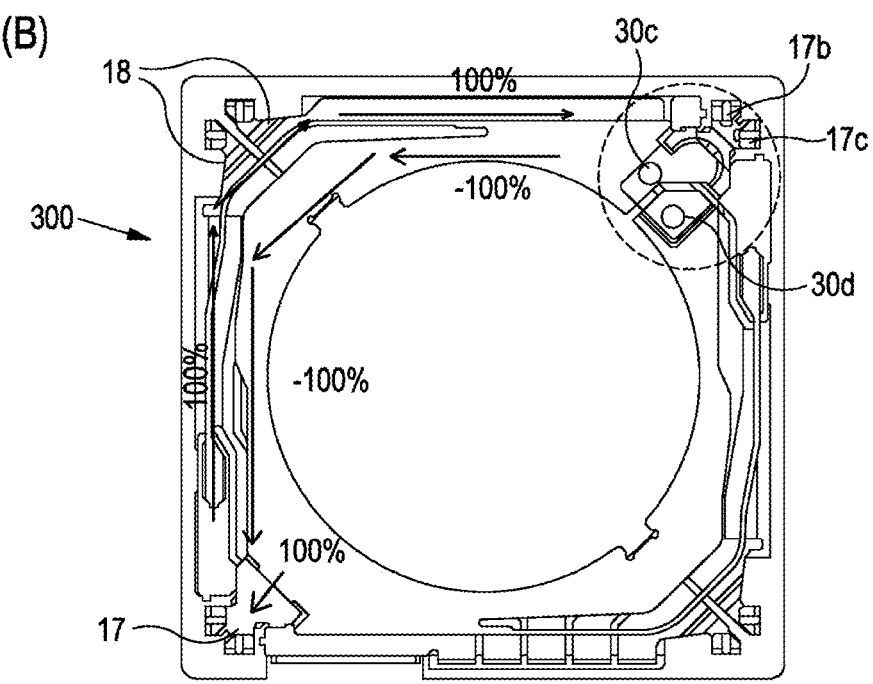

Similarly, the flexure plate 30 may be modified to divert the second electrical path in other SMA wires 13, 14 in the SMA actuator 10. FIGS. 5A and 5B respectively shows percentage current flow along the flexure plate of the example embodiment and an SMA actuator 300 according to a third embodiment of the present invention. The SMA actuator 300 is structurally and functionally similar to the example embodiment 10 of FIG. 1. The SMA actuator 300 differs from the example embodiment 10 in that it comprises a modified second electrical paths for SMA wires 13, 14 (illustrated by means of arrows), whilst their first electrical paths of remain the same. The SMA actuator 300 may also utilise a modified first electrical path, e.g. by the split conductive layer on the support structure, of SMA actuator 100, as shown in the FIGS. 2A and 2B. Such an arrangement allows the entire second electrical paths to extend adjacent to, and in parallel to respective SMA wires 13, 14 and their first electrical paths.

In the example embodiment of FIG. 5A, it is shown that around 40% of the current flow in the flexure plate 30 in a clockwise direction towards moveable crimp 17, whereas the remaining 60% of the current flow circulates around the image sensor in the counter-clockwise direction. That is, the second electrical paths of SMA wires 13, 14 are split along the flexure plate 30. Thus, neither of the second electrical paths is sufficient for fully cancelling magnetic flux from their respective SMA wires 13, 14 and first electrical paths. The ratio of the boundary area to the area of magnetic flux of SMA wires 13, 14 are 0.48 and 0.46 respectively.

FIG. 5B shows a modified flexure plate 30 that has been etched with an electrical break at along the top right-hand corner as shown, in order to remove the conduction path along the clockwise direction. In this embodiment the flexure plate 30 is split into two adjoining portions 30c, 30d to form the said electrical break, however in other embodiments the electrical break may be formed from an insulated portion. To maintain the mechanical stability of the split flexure plates 30c, 30d, the moveable crimps 17 for SMA wires 11, 12 are extended over the gap, to which the split flexure plate 30c are welded and split flexure plate 30d glued. More specifically, the moveable crimps 17 comprises a pocket etched into the split flexure plates 30d in an area where an adhesive is applied, ensuring a thick adhesive layer exists to effect electrical insulation. Advantageously, such an arrangement may effectively reduce the magnetic flux into the image sensor because the second electrical paths for SMA wires 13, 14 allow electrical current to flow in an opposite direction to, and extends adjacently along, the entire lengths of the SMA wire 13, 14, as well as their first electrical paths toward electrical terminal 1 and 2. Accordingly, the ratio of the boundary area to the area of magnetic flux of SMA wires 13, 14 are reduced to 0.18 and 0.15 respectively.

Moreover, when the split flexure plate 30c, 30d in this embodiment is combined with the arrangement in SMA actuator 100 such that the image noise for SMA wire 12, 13, 14 can be reduced to a level comparable with SMA wire 11. This results in a ratio of the boundary area to the area of magnetic flux of SMA wires 11, 12, 13, 14 of 0.17, 0.28, 0.18 and 0.15 respectively. Advantageously, such an arrangement significantly reduces the respective area of magnetic flux in each of the SMA wires 11, 12, 13, 14, thus effectively minimising the magnetic flux in the proximity of the image sensor.

Figure 6:
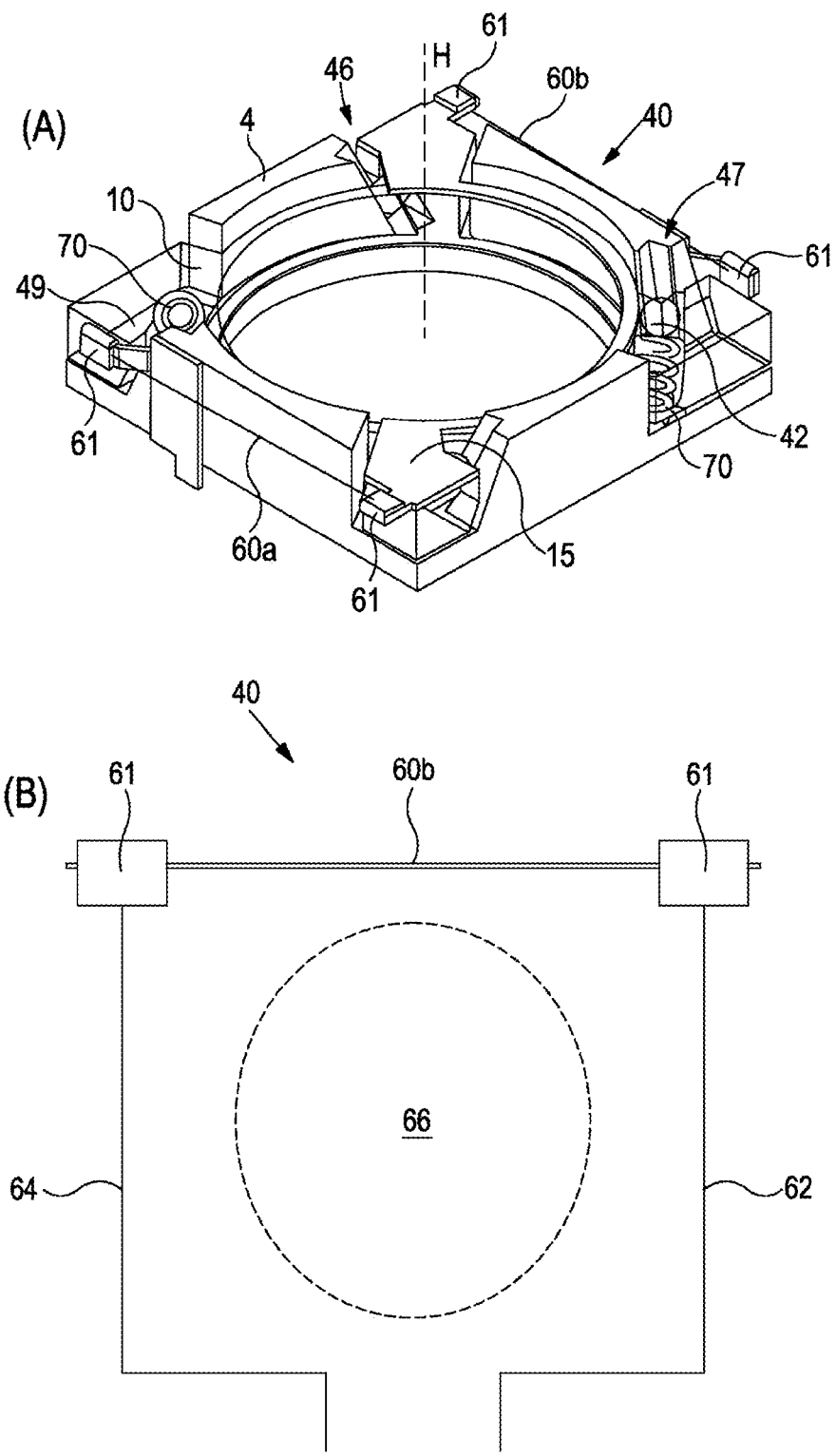
FIGS. 6A, 6B and 6C respectively show a perspective view, a schematic diagram and a magnetic flux plot of an example helical bearing arrangement.
Figure 6:
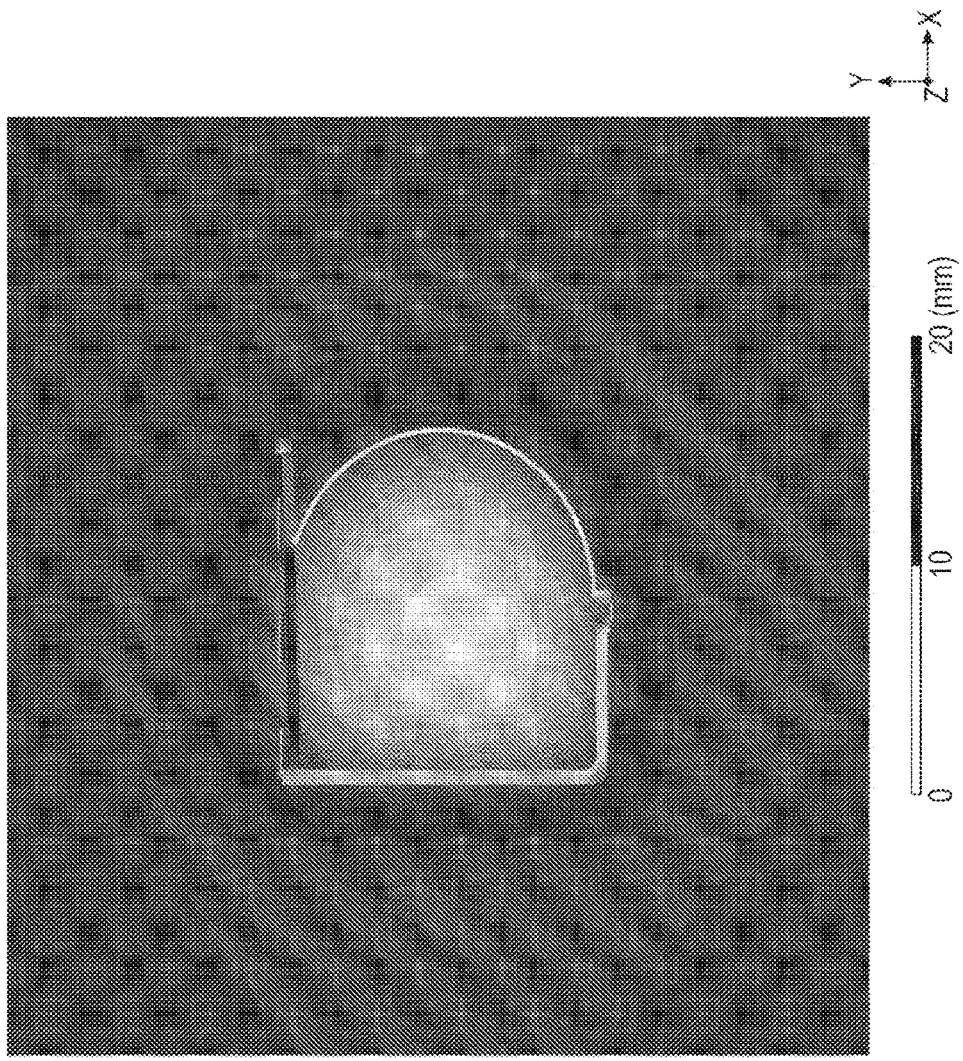
Figure 6:
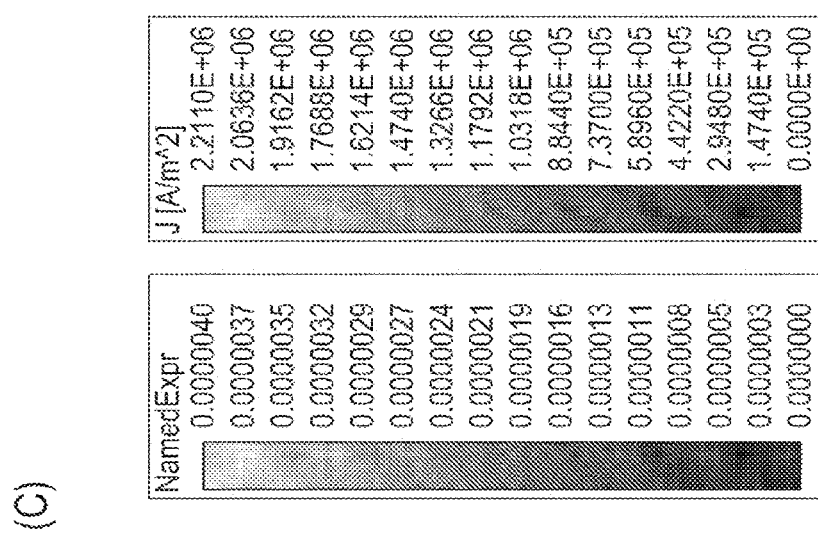

The use of opposing electrical paths for magnetic flux reduction may be applied in other SMA arrangements. FIG. 6A illustrates an example helical bearing arrangement 40 comprising a moveable part 15 rotationally moveable to a support structure 4, wherein the relative rotation is converted into axial movement along a helical axis H by the bearing arrangement 40. The helical bearing arrangement 40 includes four helical bearings 46 to 49 each comprising a single rolling bearing element 42. The four helical bearings 46 to 49 are equally angularly spaced around the helical axis H and have the rolling bearing elements 42 bearing against bearing surfaces along respective grooves. The bearing surfaces are 'planar' in the sense that they are surfaces which provide only a single point of contact with the ball bearing.

As shown in FIG. 6A, a pair of SMA wires 60a, 60b are provided on opposite sides of the helical bearing arrangement 40. The pair of SMA wires 60a, 60b are each mechanically and electrically connected to the moveable part 15 and the support structure by crimps 61. Such connection may be formed by laser welding. The SMA wires 60a, 60b are configured to, on contraction, cause relative rotation and thereby move the moveable part 15 towards the support structure 4 along the helical axis H. In some other embodiments, two pair of SMA wires may be provided on the same side or adjacent sides of the helical bearing arrangement.

In the helical bearing arrangement 40, some of the helical bearings 46 to 49 are subjected to a loading force as applied by the respective resilient biasing element 70. As such, the loading force allows the bearings to be loaded thus it enables precise position control along the helical axis.

FIGS. 6B and 6C respectively shows a plan schematic view and magnetic flux density (Bz) map for the SMA wire 60b. It is shown that the first electrical path 62 and the second electrical path 64 are extending on opposite sides the lens aperture 66, towards respective electrical terminal and ground terminal. As such it forms a current loop around the image sensor positioned beneath the lens carriage 66. Thus, such an arrangement causes a significant level of magnetic flux in the image sensor region, as shown in the magnetic flux density contour plot of FIG. 6C based on a 100 mA current flow.

Figure 7:
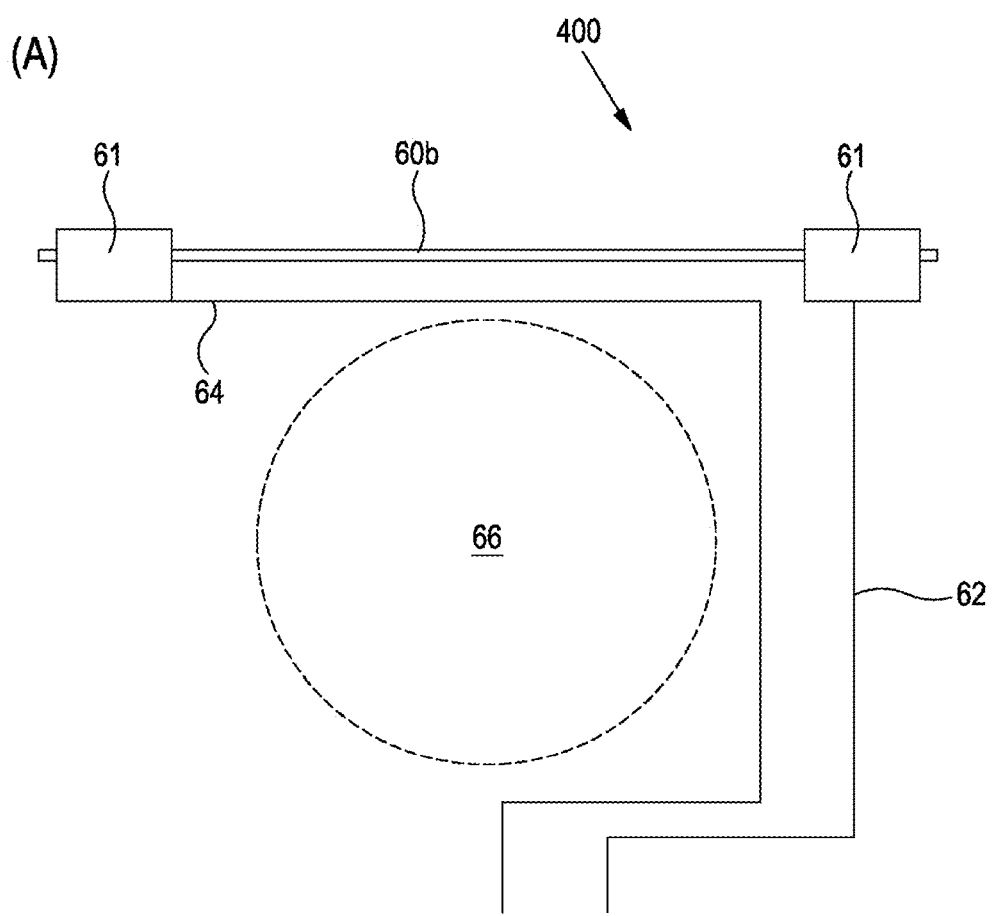
FIGS. 7A and 7B respectively shows a schematic diagram and a magnetic flux plot according to a fourth embodiment of the present invention.
Figure 7:
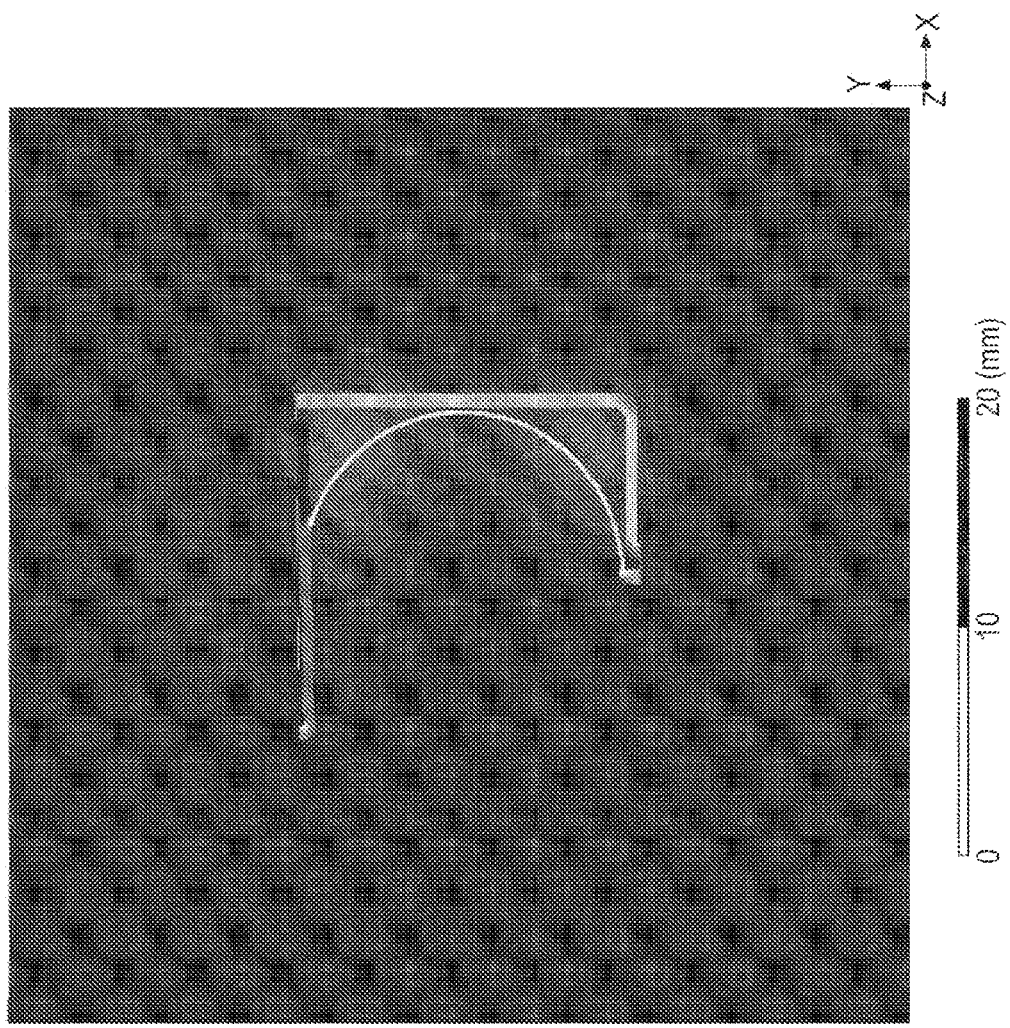
Figure 7:
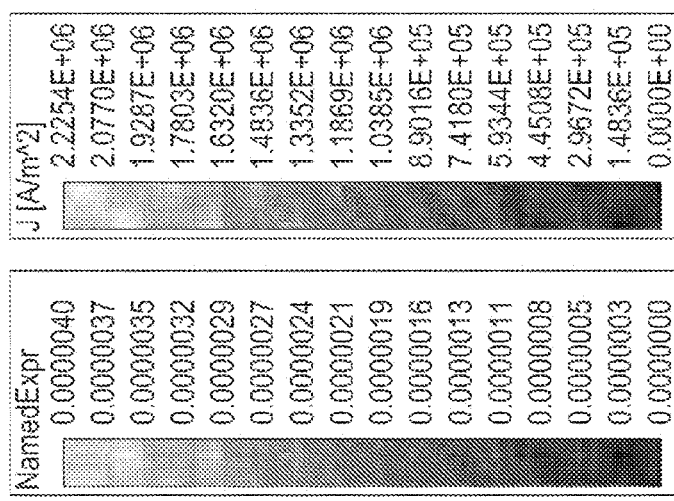

FIGS. 7A and 7B respectively shows a plan schematic view and magnetic flux density map for the SMA wire 60*b* an SMA actuator 400 according to a fourth embodiment of the present invention. The actuator 400 is structurally and functionally similar to the helical bearing arrangement 40 of FIG. 6. The SMA actuator 400 differs from the helical bearing arrangement 40 in that it comprises a modified second electrical path 64 for the SMA wire 60*b* where it is arranged to extend adjacent to, and in parallel to the entire length of the SMA wire 60*b* and the corresponding first electrical path 62.

Advantageously, such an arrangement significantly reduces the magnetic flux around the lens aperture 66, and the image sensor positioned therebelow. Referring to FIG. 7B, a traceable level of magnetic flux inevitably exists along the first and second electrical paths but it is clearly shown that the magnetic flux around the lens aperture 66 is significantly reduced. In comparison to the helical bearing arrangement 40 of FIG. 6C, the magnetic flux in the region of the image sensor is reduced by as much as 13 times in SMA actuator 400.

Similarly, in some other embodiments, the first electrical path 62 of SMA wire 60*b* in FIG. 6B may be modified to extend adjacent to, and in parallel to the entire length of the SMA wire 60*b* and the corresponding second electrical path 64. Such an arrangement may achieve a level of magnetic flux reduction similar to that as shown in FIG. 7B.

Figure 8:
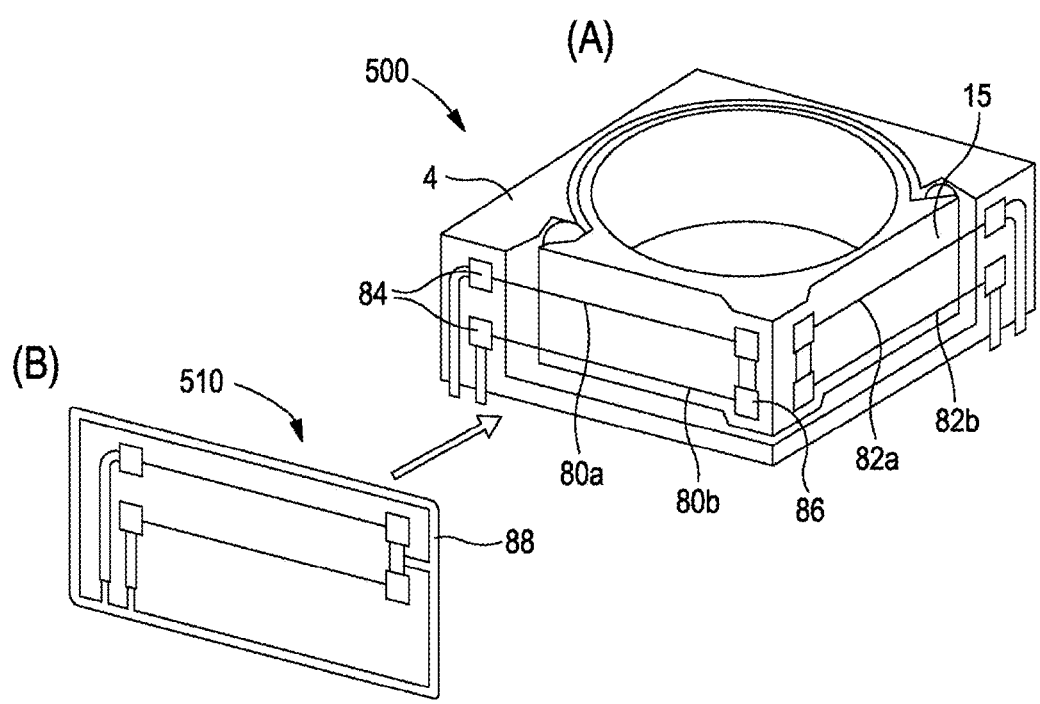
FIGS. 8A and 8B are perspective plots respectively showing an SMA actuator and an SMA crimp fret according to a fifth embodiment of the present invention.

The application of opposing electrical paths for magnetic flux reduction may be embodied in a single pair of parallelly extending SMA wires. FIGS. 8A and 8B respectively show a perspective view of an SMA actuator 500 and an SMA crimp fret 510 according to a fifth embodiment of the present invention. The actuator 500 is structurally and functionally similar to the helical bearing arrangement 40 of FIG. 6. The SMA actuator 500 differs from the helical bearing arrangement 40 in that it comprises two sets of SMA wiring arrangement 80, 82 positioned on two adjacent sides. Each set of SMA wiring arrangement 80, 82 comprises two serially connected SMA wires 80*a*, 80*b* and 82*a*, 82*b* extending adjacently and in parallel to each other, wherein on contraction, each pair of SMA wires 80*a*, 80*b* and 82*a*, 82*b* is configured to cause relative rotation between the moveable part 15 and support structure 4 in opposite directions. Thus, such an arrangement removes the need for individual biasing springs 70 that are otherwise required in the helical bearing arrangement 40.

Using the SMA arrangement 80 as an example, each of the SMA wires 80*a*, 80*b* is connected to support structure 4 by static crimps 84. The SMA wires 80*a*, 80*b* extend adjacent to each other and in a direction substantially perpendicular to the helical axis. The SMA wires 80*a*, 80*b* are serially connected by a crimp 86 at the moveable part 15. Thus, during actuation, the current flow in each of the SMA wires 80*a*, 80*b* are substantially identical. In other words, the first electrical paths and second electrical paths in each SMA wire arrangements 80, 82 each comprise two lengths of SMA wire 80*a*, 80*b* and 82*a*, 82*b*. Advantageously, such an arrangement may permit the magnetic flux from each of the pairs of SMA wires 80*a*, 80*b* and 82*a*, 82*b* to cancel out.

In addition to magnetic flux reduction, the dual SMA wiring arrangement 80, 82 may advantageously increase the actuator force, or permit the use of dual thinner SMA wires which increases the rate of cooling in the SMA wires, thereby enabling more rapid motion in the SMA actuator.

The SMA wires arrangement 80, 82 and their respective crimps 84, 86 may be pre-formed in a dual wire crimp fret 510 as shown in FIG. 8B. For example, the crimp fret 510 comprises a frame 88 formed integrally with the crimps 84, 86, with a predetermined space separating each of the crimps 84, 86. As such, the length of each of the SMA wires 80*a*, 80*b*, 82*a*, 82*b* can be defined by the predetermined separation, thus enabling a precise length of SMA wire to be applied. Once the SMA wires 80*a*, 80*b*, 82*a*, 82*b* are attached to their respective crimps 82, 84, the dual wire crimp fret 510 may be affixed on to the SMA actuator 500 before the frame 88 is removed. Such crimp fret may be attached directly onto the SMA actuator and may not require additional common electrical connection for the wires. Such an arrangement advantageously reduces the number of actuator parts and simplifies the assembly process.

In some other embodiments, the dual SMA wiring arrangement 80, 82 in the dual wire crimp fret may not be in serial connection. Using the SMA wiring arrangement 80 as an example, the plural SMA wires may extend in parallel to each other, and attached to separate crimps at both ends. Thus, the plural SMA wires may each form a discrete current loop. The plural SMA wires may have electrical currents flowing in opposite direction to minimise combined magnetic flux from each of the plural SMA wires. Or alternatively, the plural SMA wires may have electrical currents flowing in the same direction.

In some other embodiments, the technique of magnetic flux cancellation, or reduction, does not necessarily need to rely on having parallelly arranged first and second electrical path in the same SMA component. Instead it may be effected by parallel current loops with electrical current flowing in opposite directions.

For example, the first and second electrical paths of each of plural SMA components may not extend adjacent to and in parallel with each other. Thus, on their own, they may each form a discrete current loop that induces a level of magnetic flux that causes interference at the electronic component. However, when two such current loops are extending, at least in part, adjacently and in parallel to each other, with electrical current flowing in opposite directions, a cancelling effect may arise. The electronic component and electrical paths may be stacked or extending along the same plane along a primary axis. The electrical current in the two current loops may not need to be identical, since the two SMA components in the current loops may be actuated at different rates. Nevertheless, such an arrangement may be effective in at least reducing the level of combined magnetic flux in the current loops.

The invention claimed is:

1. A shape memory alloy (SMA) actuator for a camera assembly, comprising:
   a support structure for supporting an electronic component extending along a plane orthogonal to a primary axis, wherein the electronic component is susceptible to interference caused by magnetic flux;
   a moveable part moveable relative to the support structure;
   one or more lengths of SMA wire connected between the moveable part and the support structure, wherein the one or more lengths of SMA wire are configured to, on contraction, drive movement of the moveable part;

a first electrical path and a second electrical path defined between, and/or including, each of the one or more lengths of SMA wire and respective electrical terminals; and wherein the first and second electrical paths of each of the one or more lengths of SMA wire are configured to, at least in part, extend adjacently to and in parallel with each other, and enabling the majority of electrical current in the respective paths to flow in opposite directions, so as to reduce or minimise combined magnetic flux from the first and second electrical paths into the electronic component.

2. The SMA actuator according to claim 1, wherein the first and second electrical paths extend in opposite sense proximally to the electronic component around the electronic component when viewed along the primary axis, and/or on the sides the electronic component when viewed along the plane.

3. The SMA actuator according to claim 1, wherein the electronic component comprises an image sensor.

4. The SMA actuator according to claim 1, wherein each of the one or more lengths of SMA wire forms part of one of the first electrical path and the second electrical path, wherein the other of the first electrical path and the second electrical path is configured to, at least in part, extend adjacently to and in parallel with at least a part of the length of SMA wire.

5. The SMA actuator according to claim 1, wherein each of the first electrical path and the second electrical path comprises one of the lengths of SMA wire, wherein the lengths of SMA wire are serially connected and extend adjacently to and parallel with each other.

6. The SMA actuator according to claim 1, wherein the electrical currents are delivered by pulse width modulated (PWM) control signals with a PWM frequency.

7. The SMA actuator according to claim 1, wherein the second electrical path comprises an electrically conductive flexure extending between the support structure and the moveable part, wherein the electrically conductive flexure is configured to provide electrical communication between each of the one or more lengths of SMA wire and a common terminal.

8. The SMA actuator according to claim 7, wherein the electrically conductive flexure is arranged such that the second electrical path is, at least in part, extending adjacently and in parallel to the respective first electrical path of each of the one or more lengths of SMA wire.

9. The SMA actuator according to claim 7, wherein the electrically conductive flexure comprises at least one electrical break for diverting one or more second electrical paths, wherein the electrically conductive flexure comprises flexible arm portions biasing against the moveable part and the support structure, the flexible arm portions are connected to a flexure body having at least two conductive paths, wherein the electrical break is formed across one of the conductive paths, thereby providing for a unidirectional current flow along the other of the conductive paths.

10. The SMA actuator according to claim 8, wherein the electrically conductive flexure comprises separated flexible arms biasing against the moveable part and the support structure, each of flexible arms is arranged to form a second electrical path for a respective length of SMA wire and, at least in part, extending adjacently and in parallel to the respective first electrical path of the said respective length of SMA wire.

11. The SMA actuator according to claim 1, wherein the first electrical path of the length of SMA wire comprises an electrically conductive layer provided on the support structure, wherein the electrically conductive layer is arranged such that the first electrical path is, at least in part, extending adjacently and in parallel to the respective second electrical path, wherein the electrically conductive layer has at least two conductive paths, wherein an electrical break is formed across one of the conductive paths, thereby providing for a unidirectional current flow along the other of the conductive paths.

12. The SMA actuator according to claim 1, wherein the second electrical path further comprises an insulated electrical track a common terminal, wherein the insulated electrical track is arranged such that the second electrical path is, at least in part, positioned adjacently to and in parallel with the respective first electrical path of the one or more lengths of SMA wire.

13. The SMA actuator according to claim 1, wherein the first electrical path further comprises an insulated electrical track connected to the respective electrical terminal, wherein the insulated electrical track is arranged such that the first electrical path is, at least in part, positioned adjacently to and in parallel with the respective second electrical path of the one or more lengths of SMA wire.

14. The SMA actuator according to claim 1, wherein the one or more lengths of SMA wire comprises four lengths of SMA wire or eight lengths of SMA wire, wherein at least one length of SMA component wire is disposed on a respective side of the electronic component.

15. The SMA actuator according to claim 14, wherein the electrical terminals for each of the lengths of SMA wire are positioned along a first side of the SMA actuator and, when viewed along the primary axis, each of the lengths of SMA wire and their respective first and second electrical paths defines a respective area of magnetic flux.

16. The SMA actuator according to claim 1, wherein the moveable part is configured to move along a direction orthogonally to the primary axis or in a direction along the primary axis.

17. The SMA actuator according to claim 1, wherein the first and second electrical paths of each of the one or more lengths of SMA wire does not form a complete current loop around the electronic component.

18. A shape memory alloy (SMA) actuator for a camera assembly, comprising:
 a support structure having an electronic component, the electronic component extends along a plane orthogonal to a primary axis;
 a moveable part moveable relative to the support structure;
 a length of SMA wire connected between the moveable part and the support structure, wherein the length of SMA wire is configured to, on contraction, drive movement of the moveable part;
 a first electrical path and a second electrical path defined between, and/or including, the length of SMA wire and respective electrical terminals; and
 wherein the first and second electrical paths of the length of SMA wire are configured to, at least in part, extend adjacently to and in parallel with each other around at least two sides of the electronic component when viewed along the primary axis, and enabling a majority of electrical current in the respective paths to flow in opposite directions, so as to reduce or minimise combined magnetic flux from the first and second electrical paths into the electronic component.

19. A shape memory alloy (SMA) actuator for a camera assembly, comprising:

a support structure supporting an electronic component, wherein the electronic component is susceptible to interference caused by magnetic flux;

a moveable part moveable relative to the support structure;

plural lengths of SMA wire connected between the moveable part and the support structure, wherein the plural lengths of SMA wire are configured to, on contraction, drive movement of the moveable part;

respective electrical paths defined between, and/or including, each of the plural SMA components and respective electrical terminals; and wherein the electrical paths of the plural lengths of SMA wire are configured to, at least in part, extend adjacently to and in parallel with each other, and enabling electrical current in the electrical paths to flow in opposite directions, so as to reduce or minimise combined magnetic flux from the electrical paths into the electronic component.

20. The SMA actuator according to claim 19, wherein the electronic component and electrical paths are stacked or extending along the same plane along a primary axis.

* * * * *